(12) United States Patent
Sekiguchi et al.

(10) Patent No.: US 11,508,407 B2
(45) Date of Patent: *Nov. 22, 2022

(54) MAGNETIC RECORDING MEDIUM HAVING CONTROLLED DIMENSIONAL CHARACTERISTICS

(71) Applicant: Sony Corporation, Tokyo (JP)

(72) Inventors: Noboru Sekiguchi, Miyagi (JP); Minoru Yamaga, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/474,437

(22) PCT Filed: Nov. 26, 2018

(86) PCT No.: PCT/JP2018/043446
§ 371 (c)(1),
(2) Date: Jun. 27, 2019

(87) PCT Pub. No.: WO2019/187333
PCT Pub. Date: Oct. 3, 2019

(65) Prior Publication Data
US 2021/0407540 A1 Dec. 30, 2021

(30) Foreign Application Priority Data
Mar. 30, 2018 (JP) .............................. JP2018-070351

(51) Int. Cl.
*G11B 5/706* (2006.01)
*G11B 5/592* (2006.01)
(Continued)

(52) U.S. Cl.
CPC ........ *G11B 5/70678* (2013.01); *G11B 5/5928* (2013.01); *G11B 5/714* (2013.01); *G11B 5/733* (2013.01); *G11B 5/78* (2013.01)

(58) Field of Classification Search
None
See application file for complete search history.

(56) References Cited

U.S. PATENT DOCUMENTS 6,088,178 A * 7/2000 Ishida ..................... G11B 5/09
8,535,817 B2 * 9/2013 Imaoka ................ G11B 5/7085
428/844

(Continued)

FOREIGN PATENT DOCUMENTS

JP S495006 A 1/1974
JP 2004227703 A 8/2004
(Continued)

OTHER PUBLICATIONS

Japanese Office Action dated Aug. 2, 2022 in application 2020-131987.

*Primary Examiner* — Kevin M Bernatz
(74) *Attorney, Agent, or Firm* — K&L Gates LLP

(57) ABSTRACT

A magnetic recording medium is a magnetic recording medium having a tape-like shape and includes a base substrate and a magnetic layer provided on the base substrate. A plurality of data tracks can be formed in the magnetic layer, a width of a data track is 2900 nm or less, and in a case of defining, as $w_{max}$ and $w_{min}$, a maximum value and a minimum value respectively out of average values of a width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy a relation of $(w_{max}-w_{min})/w_{min} \leq 400$ [ppm].

23 Claims, 7 Drawing Sheets

(51) Int. Cl.
   *G11B 5/714* (2006.01)
   *G11B 5/733* (2006.01)
   *G11B 5/78* (2006.01)

(56) References Cited

U.S. PATENT DOCUMENTS

| | | | | |
|---|---|---|---|---|
| 10,662,259 B2* | 5/2020 | Russo | .................... | A61K 9/205 |
| 10,665,259 B1* | 5/2020 | Yamaga | .................... | G11B 5/78 |
| 10,720,181 B1* | 7/2020 | Yamaga | ................ | G11B 5/7379 |
| 10,748,570 B2* | 8/2020 | Terakawa | ............... | G11B 5/584 |
| 10,796,724 B1* | 10/2020 | Nakashio | ........... | G11B 23/0312 |
| 10,803,904 B1* | 10/2020 | Yamaga | ................ | G11B 5/716 |
| 10,839,846 B2* | 11/2020 | Yamaga | ................ | G11B 5/735 |
| 10,839,847 B2* | 11/2020 | Terakawa | ........... | G11B 5/70678 |
| 10,867,630 B2* | 12/2020 | Sekiguchi | ............. | C23C 14/562 |
| 10,923,148 B2* | 2/2021 | Enomoto | ................ | G11B 5/78 |
| 10,937,457 B2* | 3/2021 | Yamaga | ................ | G11B 5/584 |
| 10,964,346 B2* | 3/2021 | Yamaga | ........... | G11B 5/73927 |
| 10,978,104 B2* | 4/2021 | Yamaga | ........... | G11B 5/73927 |
| 10,984,833 B2* | 4/2021 | Yamaga | ................ | G11B 5/667 |
| 10,987,833 B2* | 4/2021 | Bomphray | ............ | B29C 70/222 |
| 11,017,809 B2* | 5/2021 | Yamaga | ................ | G11B 5/78 |
| 11,056,143 B2* | 7/2021 | Yamaga | ............ | G11B 5/7358 |
| 11,107,505 B2* | 8/2021 | Nakashio | ........... | G11B 5/00817 |
| 11,189,314 B2* | 11/2021 | Yamaga | .................. | G11B 5/70 |
| 11,250,884 B2* | 2/2022 | Yamaga | .................. | G11B 5/66 |
| 11,302,353 B2* | 4/2022 | Yamaga | ............ | G11B 5/7358 |
| 11,302,354 B2* | 4/2022 | Sekiguchi | .......... | G11B 5/70678 |
| 11,302,355 B2* | 4/2022 | Yamaga | ........... | G11B 23/0313 |
| 11,315,594 B2* | 4/2022 | Terakawa | ............ | G11B 5/7358 |
| 2019/0228800 A1* | 7/2019 | Muramatsu | ............... | H01F 1/11 |
| 2019/0259416 A1* | 8/2019 | Kawakami | ......... | G11B 5/70678 |
| 2019/0287561 A1* | 9/2019 | Suzuki | ............. | G11B 5/70678 |
| 2020/0066302 A1* | 2/2020 | Terakawa | ............... | G11B 5/706 |
| 2020/0098390 A1* | 3/2020 | Terakawa | ........... | G11B 5/73919 |
| 2020/0118589 A1* | 4/2020 | Terakawa | ............... | G11B 5/584 |
| 2020/0321032 A1* | 10/2020 | Nakashio | ........... | G11B 23/0316 |
| 2020/0342901 A1* | 10/2020 | Enomoto | ................ | G11B 5/78 |
| 2020/0342902 A1* | 10/2020 | Enomoto | ............... | G11B 5/584 |
| 2020/0342907 A1* | 10/2020 | Yamaga | ................ | G11B 5/714 |
| 2020/0372932 A1* | 11/2020 | Terakawa | ........... | G11B 5/00813 |
| 2020/0411043 A1* | 12/2020 | Yamaga | ........... | G11B 5/70678 |
| 2021/0012798 A1* | 1/2021 | Terakawa | ................. | G11B 5/68 |
| 2021/0012799 A1* | 1/2021 | Terakawa | ................. | G11B 5/70 |
| 2021/0012800 A1* | 1/2021 | Yamaga | ............... | G11B 5/5928 |
| 2021/0020196 A1* | 1/2021 | Sekiguchi | ............ | G11B 5/735 |
| 2021/0020197 A1* | 1/2021 | Terakawa | ................. | G11B 5/65 |
| 2021/0151075 A1* | 5/2021 | Yamaga | ............... | G11B 15/06 |
| 2021/0174830 A1* | 6/2021 | Yamaga | ............ | G11B 5/73927 |
| 2021/0241797 A1* | 8/2021 | Yamaga | ................ | G11B 5/716 |
| 2021/0249044 A1* | 8/2021 | Nakashio | ............... | G11B 15/43 |
| 2021/0249045 A1* | 8/2021 | Yamaga | .................. | G11B 5/70 |
| 2021/0280214 A1* | 9/2021 | Yamaga | ............... | G11B 5/7334 |

FOREIGN PATENT DOCUMENTS

| | | |
|---|---|---|
| JP | 2005-332510 A | 12/2005 |
| JP | 2009-087471 A | 4/2006 |
| JP | 2007-250147 A | 9/2007 |
| JP | 2008146818 A | 6/2008 |
| JP | 2008542969 A | 11/2008 |
| JP | 2009015993 A | 1/2009 |
| JP | 2010-218684 A | 9/2010 |
| JP | 2014-199706 A | 10/2014 |
| JP | 2015054808 A | 3/2015 |
| JP | 2015082329 A | 4/2015 |
| JP | 2019538702 | 11/2018 |
| JP | 6750740 B2 | 9/2020 |
| WO | WO-2015194647 A1 | 12/2015 |
| WO | WO-2016157681 A1 | 10/2016 |

* cited by examiner

A

B

MAGNETIC RECORDING MEDIUM HAVING CONTROLLED DIMENSIONAL CHARACTERISTICS

CROSS-REFERENCE TO RELATED APPLICATIONS

The present application claims the benefit of International Application No. PCT/JP2018/043446, filed Nov. 26, 2018, which claims priority to Japanese Application No. 2018-070351, filed Mar. 30, 2018, the disclosures of which are incorporated herein by reference.

BACKGROUND

The present disclosure relates to a magnetic recording medium.

In a tape-like magnetic recording medium utilized as a computer data storage, a width of a data track is very narrow in order to improve a recording density of data. Due to this, a change amount that can be allowed maximally as a dimensional change amount of the medium itself caused by environment such as a change in temperature and a change in humidity is reduced more and more.

Patent Document 1 discloses a magnetic tape medium in which a dimensional change in a width direction caused by environment is suppressed to a small amount, and it is possible to secure stable recording/reproducing characteristics with little off-tracking. Additionally, Patent Document 1 discloses that a dimensional change amount in the width direction with respect to a tension change in a longitudinal direction is reduced.

SUMMARY

Problems to be Solved by the Invention

In recent years, a width of a data track is required to be 2900 nm or less in order to improve a data recording density, and it is desired to suppress off-tracking even in a case where the track width is thus extremely narrow.

The present disclosure is directed to providing a magnetic recording medium capable of suppressing the off-tracking.

Solutions to Problems

To solve the above-mentioned problem, a first disclosure is a tape-like magnetic recording medium including a base substrate and a magnetic layer provided on the base substrate, in which a plurality of data tracks can be formed in the magnetic layer, a width of the data track is 2900 nm or less, and in a case of defining, as $w_{max}$ and $w_{min}$, a maximum value and a minimum value respectively out of average values of a width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy Relational Expression (1) below:

$$(w_{max}-w_{min})/w_{min} \leq 400 \text{ [ppm]} \tag{1}$$

A second disclosure is a tape-like magnetic recording medium including a base substrate and a magnetic layer provided on the base substrate, in which in a case of defining, as $w_{max}$ and $w_{min}$, a maximum value and a minimum value respectively out of average values of a width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy Relational Expression (1) below:

$$(w_{max}-w_{min})/w_{min} \leq 400 \text{ [ppm]} \tag{1}$$

Effects of the Invention

According to the present disclosure, off-tracking can be suppressed. Note that the effect recited herein is not necessarily limited and may be any one of effects recited in the present disclosure or an effect different therefrom.

DETAILED DESCRIPTION

An embodiment of the present disclosure will be described in the following order.

1. Configuration of Magnetic Recording Medium
2. Method of Manufacturing Magnetic Recording Medium
3. Configuration of Recording/Reproducing Apparatus
4. Operation of Recording/Reproducing Apparatus
5. Effects
6. Modified Examples

1. CONFIGURATION OF MAGNETIC RECORDING MEDIUM

Figure 1:
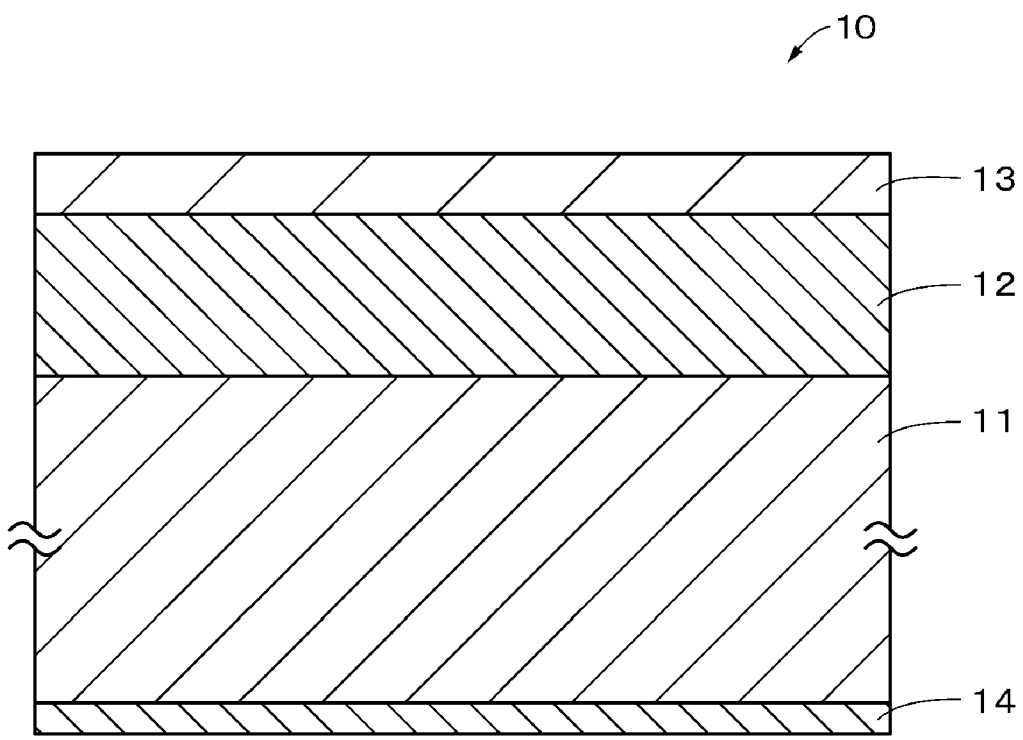
FIG. 1 is a cross-sectional view of a magnetic recording medium according to an embodiment of the present disclosure.

First, a configuration of a magnetic recording medium 10 according to an embodiment will be described with reference to FIG. 1. The magnetic recording medium 10 includes a base substrate 11 having a long shape, a foundation layer 12 provided on one of main surfaces of the base substrate 11, a magnetic layer 13 provided on the foundation layer 12, and a back layer 14 provided on the other main surface of the base substrate 11. Note that the foundation layer 12 and the back layer 14 may be provided as necessary, and may not be necessarily provided.

The magnetic recording medium 10 has a long tape-like shape, and travels in a longitudinal direction during recording/reproducing. Note that a surface of the magnetic layer 13 is a surface on which a magnetic head is made to travel. The magnetic recording medium 10 is preferably used in a recording/reproducing apparatus including a ring type head as a head for recording.

(Base Substrate)

The base substrate 11 is a non-magnetic support that supports the foundation layer 12 and the magnetic layer 13. The base substrate 11 has a long film-like shape. An upper limit value of an average thickness of the base substrate 11 is preferably 4.2 μm or less, more preferably 3.8 μm or less, and still more preferably 3.4 μm or less. When the upper limit value of the average thickness of the base substrate 11 is 4.2 μm or less, a recordable recording capacity inside one data cartridge can be greater than that of a general magnetic recording medium. A lower limit value of the average thickness of the base substrate 11 is preferably 3 μm or more, more preferably 3.2 μm or more. When the lower limit value of the average thickness of the base substrate 11 is 3 μm or more, degradation in strength of the base substrate 11 can be suppressed.

The average thickness of the base substrate 11 can be obtained as follows. First, the magnetic recording medium 10 having a ½-inch width is produced and cut into a length of 250 mm to prepare a sample. Subsequently, the layers other than the base substrate 11 of the sample (in other words, the foundation layer 12, the magnetic layer 13, and the back layer 14) are removed by a solvent such as methyl ethyl ketone (MEK) or dilute hydrochloric acid. Next, a thickness of the sample (base substrate 11) is measured at positions of five or more points by using a linear gauge manufactured by Mitsutoyo Corporation as a measuring device, and an average thickness of the base substrate 11 is calculated by simply averaging the measured values (arithmetic average). Note that the measurement positions are selected at random from the sample.

The base substrate 11 includes, for example, at least one kind out of polyesters, polyolefins, a cellulose derivative, a vinyl resin, or other polymer resins. In a case where the base substrate 11 includes two or more kinds out of the above materials, the two or more kinds of these materials may be mixed, copolymerized, or laminated.

The polyesters include at least one kind out of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene biphenoxycarboxylate, for example.

The polyolefins include at least one kind out of polyethylene (PE) or polypropylene (PP), for example. The cellulose derivatives include at least one kind out of cellulose diacetate, cellulose triacetate, cellulose acetate butyrate (CAB), or cellulose acetate propionate (CAP), for example. The vinyl resins include at least one kind out of polyvinyl chloride (PVC) or polyvinylidene chloride (PVDC), for example.

Examples of other polymer resins include at least one kind out of polyamide, nylon (PA), aromatic polyamide, aramid (aromatic PA), polyimide (PI), aromatic polyimide (aromatic PI), polyamide imide (PAI), aromatic polyamide imide (aromatic PAI), polybenzoxazole (PBO) such as ZYLON (registered trademark), polyether, polyether ketone (PEK), polyether ester, polyether sulfone (PES), polyether imide (PEI), polysulfone (PSF), polyphenylene sulfide (PPS), polycarbonate (PC), polyarylate (PAR), or polyurethane (PU).

The substrate 11 biaxially extends in the longitudinal direction and a width direction. Polymers included in the base substrate 11 are preferably oriented in an oblique direction with respect to the width direction of the base substrate 11.

(Magnetic Layer)

The magnetic layer 13 is a recording layer to record a signal. The magnetic layer 13 includes, for example, magnetic powder and a binding agent. The magnetic layer 13 may further include, as necessary, at least one kind of an additive out of a lubricant, an anti-static agent, an abrasive, a hardener, a rust inhibitor, non-magnetic reinforcing particles, or the like.

Figure 2:
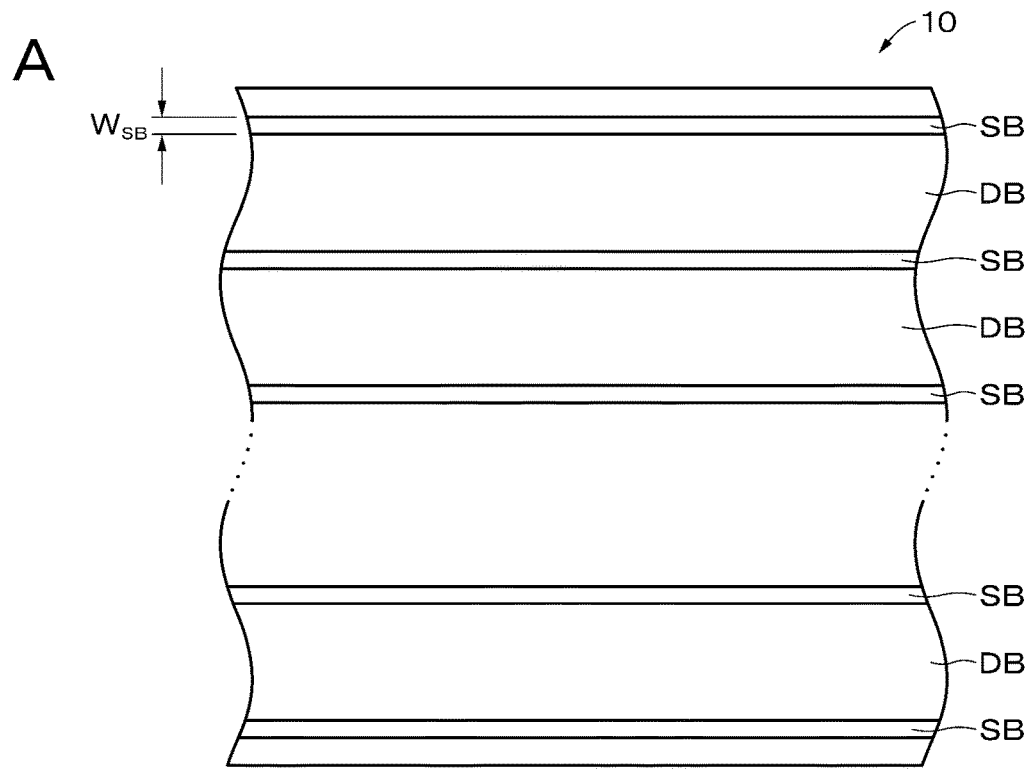
FIG. 2A is a schematic view of a layout of data bands and servo bands.
FIG. 2B is an enlarged view of a data band.
Figure 2:
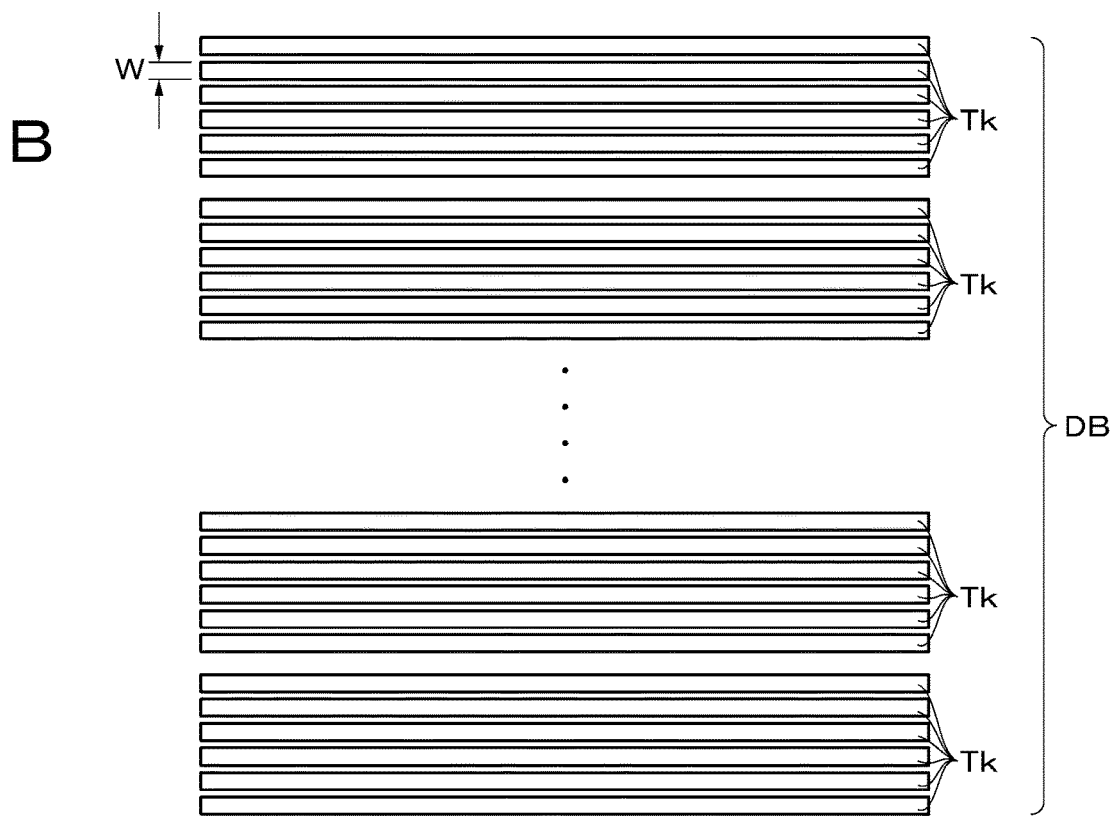

The magnetic layer 13 preferably includes a plurality of servo bands SB and a plurality of data bands DB in advance as illustrated in FIG. 2A. The plurality of servo bands SB is provided at equal intervals in a width direction of the magnetic recording medium 10. A data band DB is provided between the servo bands SB adjacent to each other. In each servo band SB, a servo signal used to perform tracking control of the magnetic head is written in advance. User data is recorded in the data bands DB.

An upper limit value of a proportion $R_S (=(S_{SB}/S) \times 100)$ of the total area $S_{SB}$ of the servo bands SB to the area S of the surface of the magnetic layer 13 is preferably 4.0% or less, more preferably 3.0% or less, and still more preferably 2.0% or less from a viewpoint of securing a high recording capacity. On the other hand, a lower limit value of the proportion $R_S$ of the total area $S_{SB}$ of the servo bands SB to the area S of the surface of the magnetic layer 13 is preferably 0.8% or more from a viewpoint of securing five or more servo tracks.

The proportion $R_S$ of the total area $S_{SB}$ of the servo bands SB to the area S of the surface of the magnetic layer 13 is obtained as follows. First, the surface of the magnetic layer 13 is observed by using a magnetic force microscope (MFM) to acquire an MFM image. Subsequently, a servo bandwidth $W_{SB}$ and the number of servo bands SB are measured by using the acquired MFM image. Next, the proportion $R_S$ is obtained from an equation below:

$$\text{Proportion } R_S[\%] = (((\text{servo bandwidth } W_{SB}) \times (\text{number of servo bands}))/(\text{width of magnetic recording medium } \mathbf{10})) \times 100.$$

The number of servo bands SB is preferably five or more, more preferably 5+4n (where n is a positive integer) or more. When the number of servo bands SB is five or more, it is possible to: suppress influence on a servo signal by a dimensional change in the width direction of the magnetic recording medium 10; and secure stable recording/reproducing characteristics with little occurrence of off-tracking. An upper limit value of the number of servo bands SB is not particularly limited, but is 33 or less, for example.

The number of servo bands SB can be confirmed as follows. First, the surface of the magnetic layer 13 is observed by using the magnetic force microscope (MFM) to acquire an MFM image. Next, the number of servo bands SB is counted by using the MFM image.

An upper limit value of the servo bandwidth $W_{SB}$ is preferably 95 μm or less, more preferably 60 μm or less, and still more preferably 30 μm or less from the viewpoint of securing the high recording capacity. A lower limit value of the servo bandwidth $W_{SB}$ is preferably 10 μm or more. It is difficult to manufacture a recording head capable of reading a servo signal of the servo bandwidth $W_{SB}$ of less than 10 μm.

The width of the servo bandwidth $W_{SB}$ can be obtained as follows. First, the surface of the magnetic layer 13 is observed by using the magnetic force microscope (MFM) to acquire an MFM image. Next, the width of the servo bandwidth $W_{SB}$ is measured by using the MFM image.

In the magnetic layer 13, a plurality of data tracks Tk can be formed in a data band DB as illustrated in FIG. 2B. An upper limit value of a data track width W is 2900 nm or less, preferably 2000 nm or less, more preferably 1500 nm or less, and still more preferably 1.0 µm or less from a viewpoint of improving a track recording density and securing the high recording capacity. A lower limit value of the data track width W is preferably 0.02 µm or more in consideration of a magnetic particle size.

The magnetic layer 13 can record data in a manner such that a minimum value L of a magnetization inversion interval and the data track width W preferably satisfy W/L≤60, more preferably W/L≤45, and still more preferably W/L≤30. When the minimum value L of the magnetization inversion interval is a constant value and the minimum value L of the magnetization inversion interval and the track width W satisfy W/L>60 (in other words, the track width W is large), there is a possibility that a sufficient recording capacity cannot be secured because the track recording density is not increased. Additionally, in a case where the track width W is the constant value and the minimum value L of the magnetization inversion interval and the track width W satisfy W/L>60 (in other words, the minimum value L of the magnetization inversion interval is small), a bit length is short and a linear recording density is increased, but there is a possibility an SNR is significantly deteriorated due to influence of spacing loss. Therefore, it is preferable that W/L be in the range of W/L≤60 as described above in order to minimize deterioration of the SNR while securing the recording capacity. A lower limit value of W/L is not particularly limited but is 1≤W/L, for example.

The magnetic layer 13 can record data in a manner such that the minimum value of the magnetization inversion interval L is preferably 48 nm or less, more preferably 44 nm or less, and still more preferably 40 nm or less from the viewpoint of securing the high recording capacity. A lower limit value of the minimum value of the magnetization inversion interval L is preferably 20 nm or more in consideration of the magnetic particle size.

An upper limit value of an average thickness of the magnetic layer 13 is preferably 90 nm or less, particularly preferably 80 nm or less, more preferably 70 nm or less, and still more preferably 50 nm or less. When the upper limit value of the average thickness of the magnetic layer 13 is 90 nm or less, in a case of using a ring type head as a recording head, influence of a demagnetic field can be reduced, and therefore, an electromagnetic conversion characteristic can be improved.

A lower limit value of the average thickness of the magnetic layer 13 is preferably 35 nm or more. When the upper limit value of the average thickness of the magnetic layer 13 is 35 nm or more, in a case of using an MR type head as a reproducing head, output can be secured, and therefore, the electromagnetic conversion characteristic can be improved.

The average thickness of the magnetic layer 13 can be obtained as follows. First, the magnetic recording medium 10 is processed thin perpendicularly to the main surface thereof to produce a test piece, and a cross section of the test piece is observed by using a transmission electron microscope (TEM). A device and observation conditions are illustrated below.

Device: TEM (H9000NAR manufactured by Hitachi, Ltd.)
Acceleration voltage: 300 kV
Magnification: 100,000 times Next, the thickness of the magnetic layer 13 is measured in at least ten or more positions in the longitudinal direction of the magnetic recording medium 10 by using an obtained TEM image, and then the average thickness of the magnetic layer 13 can be obtained by simply averaging the measured values (arithmetic average). Note that the measurement positions are selected at random from the test piece.

(Magnetic Powder) The magnetic powder includes powder of nanoparticles containing ε-iron oxide (hereinafter referred to as "ε-iron oxide particle"). The ε-iron oxide particle is a hard magnetic particle capable of achieving high coercive force even in a case of being a fine particle. It is preferable that the ε-iron oxide included in the ε-iron oxide particle be crystal-oriented preferentially in a thickness direction (vertical direction) of the magnetic recording medium 10.

The ε-iron oxide particle has a spherical shape or a substantially spherical shape, or has a cubic shape or a substantially cubic shape. Since the ε-iron oxide particle has the above-mentioned shape, in a case of using the ε-iron oxide particle as a magnetic particle, the contact area between particles in the thickness direction of the magnetic recording medium 10 is more reduced and aggregation between the particles can be more suppressed than in a case of using a hexagonal plate-like barium ferrite particle as a magnetic particle. Therefore, dispersibility of the magnetic powder can be improved, and a more excellent signal-to-noise ratio (SNR) can be achieved.

Figure 3:
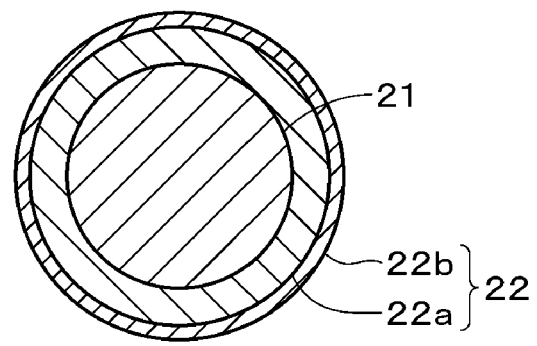
FIG. 3 is a cross-sectional view of a magnetic particle.

The ε-iron oxide particle has a core-shell type structure. More specifically, as illustrated in FIG. 3, the ε-iron oxide particle includes a core portion 21 and a shell portion 22 provided around the core portion 21 and having a two-layer structure. The shell portion 22 having the two-layer structure includes a first shell portion 22a provided on the core portion 21 and a second shell portion 22b provided on the first shell portion 22a.

The core portion 21 includes the ε-iron oxide. The ε-iron oxide included in the core portion 21 preferably has a ε-Fe$_2$O$_3$ crystal as a main phase, and including a single phase ε-Fe$_2$O$_3$ is more preferable.

The first shell portion 22a covers at least a part of a periphery of the core portion 21. More specifically, the first shell portion 22a may partially cover the periphery of the core portion 21, or may cover the entire periphery of the core portion 21. It is preferable that sufficient exchange coupling be provided between the core portion 21 and the first shell portion 22a, and an entire surface of the core portion 21 is covered from the viewpoint of improving a magnetic characteristic.

The first shell portion 22a is a so-called soft magnetic layer and includes, for example, a soft magnetic material such as α-Fe, a Ni—Fe alloy, or a Fe—Si—Al alloy. The α-Fe may be obtained by reducing the ε-iron oxide included in the core portion 21.

The second shell portion 22b is an oxide film as an oxidation preventing layer. The second shell portion 22b includes α-iron oxide, aluminum oxide, or silicon oxide. The α-iron oxide includes at least one kind of iron oxide out of Fe$_3$O$_4$, Fe$_2$O$_3$, or FeO, for example. In a case where the first shell portion 22a includes the α-Fe (soft magnetic material), the α-iron oxide may be obtained by oxidizing α-Fe included in the first shell portion 22a.

Since the ε-iron oxide particle has the first shell portion 22a as described above, coercive force Hc in the entire ε-iron oxide particle (core shell particle) can be adjusted to the coercive force Hc suitable for recording while keeping the coercive force Hc of the core portion 21 alone at a large value in order to secure thermal stability. Additionally, since the ε-iron oxide particle has the second shell portion 22b as described above, it is possible to suppress, before and during a manufacturing process of the magnetic recording medium 10, deterioration of the characteristic of the ε-iron oxide particle by the ε-iron oxide particle being exposed to the air and causing rust or the like on the particle surface. Therefore, characteristic deterioration of the magnetic recording medium 10 can be suppressed.

An average particle size (average maximum particle size) of the magnetic powder is, for example, 22.5 nm or less. The average particle size (average maximum particle size) of the magnetic powder is preferably 22 nm or less, more preferably 8 nm or more and 22 nm or less, still more preferably 12 nm or more and 22 nm or less, particularly preferably 12 nm or more and 15 nm or less, and most preferably 12 nm or more and 14 nm or less. In the magnetic recording medium 10, a region having a ½ size of a recording wavelength is an actual magnetization region. Therefore, an excellent electromagnetic conversion characteristic (e.g., SNR) can be achieved by setting the average particle size of the magnetic powder to half or less a shortest recording wavelength. Therefore, when the average particle size of the magnetic powder is 22 nm or less, an excellent electromagnetic conversion characteristic (e.g., SNR) can be achieved in the magnetic recording medium 10 having a high recording density (for example, the magnetic recording medium 10 that can record a signal at a shortest recording wavelength of 44 nm or less). On the other hand, when the average particle size of the magnetic powder is 8 nm or more, the dispersibility of the magnetic powder is further improved, and a more excellent electromagnetic conversion characteristic (e.g., SNR) can be achieved.

An average aspect ratio of the magnetic powder is preferably 1.0 or more and 3.0 or less, more preferably 1.0 or more and 2.5 or less, still more preferably 1.0 or more and 2.1 or less, and particularly preferably 1.0 or more and 1.8 or less. When the average aspect ratio of the magnetic powder is in the range of 1.0 or more and 3.0 or less, aggregation of the magnetic powder can be suppressed. Additionally, when the magnetic powder is vertically oriented in a process of forming the magnetic layer 13, resistance applied to the magnetic powder can be suppressed. Therefore, a vertical orientation property of the magnetic powder can be improved.

The average particle size and the average aspect ratio of the above magnetic powder can be obtained as follows. First, the magnetic recording medium 10 is processed by focused ion beam (FIB) process or the like to produce a thin piece, and a cross section of the thin piece is observed by the TEM. Next, fifty ε-iron oxide particles are randomly selected from a photographed TEM photograph, and a long axis length DL and a short axis length DS of each of the ε-iron oxide particles are measured. Here, the long axis length DL means a largest length out of distances between two parallel lines drawn from all angles (so-called maximum Feret diameter) so as to contact a contour of the ε-iron oxide particle. On the other hand, the short axis length DS means a largest length out of lengths of the ε-iron oxide particle and directed in a direction orthogonal to the long axis of the ε-iron oxide particle.

Subsequently, an average long axis length DLave is obtained by simply averaging the long axis lengths DL of the measured fifty ε-iron oxide particles (arithmetic average). The average long axis length DLave thus obtained is defined as an average particle size of the magnetic powder. Additionally, an average short axis length DSave is obtained by simply averaging short axis lengths DS of the measured fifty ε-iron oxide particles (arithmetic average). Then, an average aspect ratio (DLave/DSave) of the ε-iron oxide particles is obtained from the average long axis length DLave and the average short axis length DSave.

An average particle volume of the magnetic powder is preferably 5600 nm$^3$ or less, more preferably 250 nm$^3$ or more and 5600 nm$^3$ or less, still more preferably 900 nm$^3$ or more and 5600 nm$^3$ or less, particularly preferably 900 nm$^3$ or more and 1800 nm$^3$ or less, and most preferably 900 nm$^3$ or more and 1500 nm$^3$ and less. Generally, since noise of the magnetic recording medium 10 is inversely proportional to a square root of the number of particles (in other words, proportional to a square root of a particle volume), an excellent electromagnetic characteristic (e.g., SNR) can be achieved by reducing the particle volume. Therefore, when the average particle volume of the magnetic powder is 5600 nm$^3$ or less, the excellent electromagnetic conversion characteristic (e.g., SNR) can be achieved as an effect similar to that in the case where the average particle size of the magnetic powder is 22 nm or less. On the other hand, when the average particle volume of the magnetic powder is 250 nm$^3$ or more, it is possible to achieve an effect similar to that in the case where the average particle size of the magnetic powder is 8 nm or more.

In a case where the ε-iron oxide particle has the spherical shape or the substantially spherical shape, the average particle volume of the magnetic powder is obtained as follows. First, the average long axis length DLave is obtained in a manner similar to the above-described calculation method of the average particle size of the magnetic powder. Next, an average particle volume V of the magnetic powder is obtained by an equation below:

$$V = (\pi/6) \times DLave^3.$$

In a case where the ε-iron oxide particle has the cubic shape or the substantially cubic shape, the average particle volume of the magnetic powder can be obtained as follows. First, the magnetic recording medium 10 to be measured is processed by the FIB process or the like to produce a thin piece, and a cross section of the thin piece is observed by the TEM. Subsequently, fifty ε-iron oxide particles having surfaces parallel to the TEM cross section are randomly selected from a photographed TEM photograph, and a length L of one side of each of the ε-iron oxide particles is measured. Next, an average side length Lave is obtained by simply averaging lengths L of the sides of the fifty ε-iron oxide particles (arithmetic average).

$$V = Lave^3$$

(Binding Agent)

Examples of the binding agent can include a thermoplastic resin, a thermosetting resin, a reactive resin, and the like. Examples of the thermoplastic resin can include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene-butadiene copolymer, a polyurethane resin, a polyester resin, an amino resin, synthetic rubber, and the like.

Examples of the thermosetting resin can include a phenol resin, an epoxy resin, a polyurethane curable resin, a urea resin, a melamine resin, an alkyd resin, a silicone resin, a polyamine resin, a urea formaldehyde resin, and the like.

In all of the above-mentioned binding agents, $-SO_3M$, $-OSO_3M$, $-COOM$, and $P=O(OM)_2$ (where M in the formula represents an alkali metal such as a hydrogen atom or lithium, potassium, potassium, or the like), and side chain type amine including an end group represented by $-NR1R2$ and $-NR1R2R3^+X^-$, a main chain type amine represented by $>NR1R2^+X^-$ (where each of R1, R2 and R3 in the formula represents a hydrogen atom or a hydrocarbon group, and $X^-$ represents a halogen element ion such as fluorine, chlorine, bromine, or iodine, an inorganic ion, or an organic ion), and additionally polar functional groups such as $-OH$, $-SH$, and $-CN$, and an epoxy group may be introduced in order to improve the dispersibility of the magnetic powder. An introducing amount of these polar functional groups into the binding agent is preferably $10^{-1}$ to $10^{-8}$ mol/g, and more preferably $10^{-2}$ to $10^{-6}$ mol/g.

(Lubricant)

Examples of the lubricant can include ester of monobasic fatty acid having 10 to 24 carbon atoms and any one of monohydric to hexahydric alcohol having 2 to 12 carbon atoms, mixed ester thereof, difatty acid ester, trifatty acid ester, and the like. Specific examples of the lubricant can include lauric acid, myristic acid, palmitic acid, stearic acid, behenic acid, oleic acid, linoleic acid, linoleic acid, elaidic acid, butyl stearate, pentyl stearate, heptyl stearate, octyl stearate, isooctyl stearate, octyl myristate, and the like.

(Anti-Static Agent) Examples of the anti-static agent can include carbon black, natural surfactant, nonionic surfactant, cationic surfactant, and the like.

(Abrasive)

Examples of the abrasive can include α-alumina having a pregelatinized rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, and acicular a iron oxide obtained by dehydrating and annealing a raw material of magnetic iron oxide, those obtained by applying surface treatment to these kinds of abrasive with aluminum and/or silica as necessary, and the like.

(Hardener)

Example of the hardener can include polyisocyanate and the like. Examples of the polyisocyanate can include aromatic polyisocyanate such as an adduct of tolylene diisocyanate (TDI) and an active hydrogen compound, aliphatic polyisocyanate such as an adduct of hexamethylene diisocyanate (HMDI) and an active hydrogen compound, and the like. A weight-average molecular weight of each of these kinds of polyisocyanate is desirably in a range of 100 to 3,000.

(Rust Inhibitor)

Examples of the rust inhibitor include phenols, naphthols, quinones, a heterocyclic compound including a nitrogen atom, a heterocyclic compound including an oxygen atom, a heterocyclic compound including a sulfur atom, and the like.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Foundation Layer)

The foundation layer 12 is a non-magnetic layer including non-magnetic powder and the binding agent. The foundation layer 12 may further include at least one kind of an additive out of the lubricant, the anti-static agent, the hardener, the rust inhibitor, or the like, as necessary.

An average thickness of the foundation layer 12 is preferably 0.6 μm or more and 2.0 μm or less, more preferably 0.8 μm or more and 1.4 μm or less. Note that the average thickness of the foundation layer 12 can be obtained in a manner similar to the average thickness of the magnetic layer 13. However, a magnification of a TEM image is appropriately adjusted in accordance with the thickness of the foundation layer 12.

(Non-Magnetic Powder)

The non-magnetic powder includes, for example, at least one kind of inorganic particle powder or organic particle powder. Also, the non-magnetic powder may include carbon powder such as carbon black. Note that one kind of the non-magnetic powder may be used alone, or two or more kinds of non-magnetic powder may be used in combination. An example of the inorganic particle includes, for example, metal, metal oxide, metal carbonate, metal sulfate, metal nitride, metal carbide, metal sulfide, or the like. Exemplary shapes of the non-magnetic powder can include various kinds of shapes such as an acircular shape, a sphere shape, a cubic shape, and a plate-like shape, but not limited to these shapes.

(Binding Agent)

The binding agent is similar to that of the magnetic layer 13 described above.

(Additive)

The lubricant, the anti-static agent, the hardener, and the rust inhibitor are respectively similar to those of the magnetic layer 13 described above.

(Back Layer)

The back layer 14 includes the binding agent and the non-magnetic powder. The back layer 14 may further include at least one kind of an additive out of the lubricant, the hardener, the anti-static agent, or the like, as necessary. The binding agent and the non-magnetic powder are similar to those of the foundation layer 12 described above.

An average particle size of the non-magnetic powder is preferably 10 nm or more and 150 nm or less, more preferably 15 nm or more and 110 nm or less. The average particle size of the non-magnetic powder is obtained in a manner similar to the average particle size of the above magnetic powder. The non-magnetic powder may also include the non-magnetic powder having two or more kinds of particle size distribution.

An upper limit value of an average thickness of the back layer 14 is preferably 0.6 μm or less. When the upper limit value of the average thickness of the back layer 14 is 0.6 μm or less, even in a case where the average thickness of the magnetic recording medium 10 is 5.6 μm or less, the thickness of the foundation layer 12 and the thickness of the base substrate 11 can be kept thick, and therefore, travel stability of the magnetic recording medium 10 can be maintained inside the recording/reproducing apparatus. A lower limit value of the average thickness of the back layer 14 is not particularly limited but is 0.2 μm or more, for example.

The average thickness of the back layer 14 is obtained as follows. First, the magnetic recording medium 10 having a ½-inch width is produced and cut into a length of 250 mm to prepare a sample. Next, a thickness of the sample is measured at five or more points by using the linear gauge manufactured by Mitsutoyo Corporation as a measuring device, and an average thickness $t_T$ [μm] of the magnetic recording medium 10 is calculated by simply averaging the measured values (arithmetic average). Note that the measurement positions are selected at random from the sample. Subsequently, the back layer 14 of the sample is removed by a solvent such as methyl ethyl ketone (MEK) or dilute hydrochloric acid. Thereafter, the thickness of the sample is measured again at five or more points by using the above-described linear gauge, and an average thickness $t_B$ is [μm] of the magnetic recording medium 10 from which the back layer 14 has been removed is calculated by simply averaging the measured values (arithmetic average). Note that the measurement positions are selected at random from the sample. Thereafter, the average thickness $t_b$ [μm] of the back layer 14 is obtained by an equation below:

$$t_b[\mu m]=t_T[\mu m]-t_B[\mu m].$$

(Average Thickness of Magnetic Recording Medium)

An upper limit value of the average thickness (average total thickness) of the magnetic recording medium 10 is, for example, 5.7 μm or less. When the average thickness of the magnetic recording medium 10 is 5.7 μm or less, a recordable recording capacity inside one data cartridge can be greater than that of a general magnetic recording medium. The upper limit value of the average thickness (average total thickness) of the magnetic recording medium 10 is preferably 5.6 μm or less, more preferably 5.0 μm or less, particularly preferably 4.6 μm or less, and still more preferably 4.4 μm or less. When the average thickness of the magnetic recording medium 10 is 5.6 μm or less, the recordable recording capacity inside one data cartridge can be further greater than that of the general magnetic recording medium. A lower limit value of the average thickness of the magnetic recording medium 10 is not particularly limited, but is 3.5 μm or more, for example.

The average thickness of the magnetic recording medium 10 can be obtained by the procedure described in the method of obtaining the average thickness of the back layer 14 described above.

(Rule for Width Change of Magnetic Recording Medium)

In a case of defining, as $w_{max}$ and $w_{min}$, a maximum value and a minimum value respectively out of average values of the width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy Relational Expression (1) below:

$$(w_{max}-w_{min})/w_{min} \leq 400 \text{ [ppm]} \tag{1}$$

Since $w_{max}$ and $w_{min}$ satisfy the above Relational Expression (1), off-tracking can be suppressed in the magnetic recording medium 10 in which the data track width W is 2900 nm or less.

The maximum value $w_{max}$ and the minimum value $w_{min}$ can be obtained as follows. First, the magnetic recording medium 10 having a ½-inch width is prepared. Next, the magnetic recording medium 10 is housed inside a chamber controlled to have the environment of (10° C., 10%), the magnetic recording medium 10 is made to become accustomed to the above-described environment, and then the width of the magnetic recording medium 10 is measured. Note that the measurement of the width is performed for three tape pieces taken out from total three different positions at every 400 m interval in the longitudinal direction (travel direction) of the magnetic recording medium 10. Additionally, as a measuring device, a device illustrated in FIG. 5 or the like is used. In other words, this is a device in which a light emitting portion and a light receiving portion such as a laser or a light emitting diode (LED) are installed in a manner facing a tape surface, the light emitting portion emits, to the tape, linear light parallel to a tape width direction, the light receiving portion can measure a light amount not shielded by the tape, and the device can measure a tape width by this device. Thereafter, the widths of the magnetic recording medium 10 measured in the three tape pieces are simply averaged (arithmetic average). With this calculation, an average value w of the width of the magnetic recording medium 10 under the environment of (10° C., 10%) is obtained.

Next, an average value w of the width of the magnetic recording medium 10 under each of the kinds of environment (10° C., 80%), (29° C., 80%), and (45° C., 10%) is obtained by performing the procedure similar to that performed to obtain the average value w of the magnetic recording medium 10 under the environment of (10° C., 10%). Then, the maximum value $w_{max}$ and the minimum value $w_{min}$ are selected from the average values w of the width of the magnetic recording medium 10 under the four kinds of environment obtained as described above.

(Coercive Force Hc)

An upper limit value of the coercive force Hc in the longitudinal direction of the magnetic recording medium 10 is preferably 2000 Oe or less, more preferably 1900 Oe or less, and still more preferably 1800 Oe or less. When the coercive force Hc in the longitudinal direction is 2000 Oe or less, a sufficient electromagnetic conversion characteristic can be achieved even in a case of having a high recording density.

A lower limit value of the coercive force Hc measured in the longitudinal direction of the magnetic recording medium 10 is preferably 1000 Oe or more. When the coercive force Hc measured in the longitudinal direction is 1000 Oe or more, demagnetization caused by a leakage flux from the recording head can be suppressed.

The above-mentioned coercive force Hc is obtained as follows. First, a measurement sample is cut out from the long-shaped magnetic recording medium 10, and an M-H loop of an entire measurement sample is measured in the longitudinal direction of the measurement sample (travel direction of the magnetic recording medium 10) by using a vibrating sample magnetometer (VSM). Next, coating films (the foundation layer 12, the magnetic layer 13, the back layer 14, and the like) are wiped off by using acetone, ethanol, or the like, only the base substrate 11 is left as a sample for background correction, and an M-H loop of the base substrate 11 is measured in the longitudinal direction of the base substrate 11 (travel direction of the magnetic recording medium 10) by using the VSM. Thereafter, an M-H loop after the background correction is obtained by subtracting the M-H loop of the base substrate 11 from the M-H loop of the entire measurement sample. The coercive force Hc is obtained from the obtained M-H loop. Note that the above-described measurement for the M-H loops is all performed at 25° C. Additionally, assume that "demagnetic field correction" is not performed at the time of measuring the M-H loop in the longitudinal direction of the magnetic recording medium 10.

(Squareness Ratio)

A squareness ratio S1 in the vertical direction (thickness direction) of the magnetic recording medium 10 is preferably 65% or more, more preferably 70% or more, still more preferably 75% or more, particularly preferably 80% or more, and most preferably 85%. When the squareness ratio S1 is 65% or more, the vertical orientation property of the magnetic powder is sufficiently high, and therefore, a better SNR can be achieved.

The squareness ratio S1 is obtained as follows. First, a measurement sample is cut out from the long-shaped magnetic recording medium 10, and an M-H loop of an entire measurement sample corresponding to the vertical direction (thickness direction) of the magnetic recording medium 10 is measured by using the VSM. Next, the coating films (the foundation layer 12, the magnetic layer 13, the back layer 14, and the like) are wiped off by using acetone or ethanol, only the base substrate 11 is left as a sample for background correction, and an M-H loop of the base substrate 11 corresponding to the vertical direction of the base substrate 11 (vertical direction of the magnetic recording medium 10) is measured by using the VSM. Thereafter, an M-H loop after the background correction is obtained by subtracting the M-H loop of the base substrate 11 from the M-H loop of the entire measurement sample. The squareness ratio S1 (%) is calculated by substituting saturation magnetization Ms (emu) and residual magnetization Mr (emu) of the obtained M-H loop into an equation below. Note that the above-described measurement for the M-H loops is all performed at 25° C. Additionally, assume that the "demagnetic field correction" is not performed at the time of measuring the M-H loop in the vertical direction of the magnetic recording medium 10.

$$\text{Squareness ratio } S1(\%) = (Mr/Ms) \times 100$$

A squareness ratio S2 in the longitudinal direction (travel direction) of the magnetic recording medium 10 is preferably 35% or less, more preferably 30% or less, still more preferably 25% or less, particularly preferably 20% or less, and most preferably 15% or less. When the squareness ratio S2 is 35% or less, the vertical orientation property of the magnetic powder is sufficiently high, and therefore, a better SNR can be achieved.

The squareness ratio S2 is obtained in a manner similar to the squareness ratio S1 except that the M-H loop is measured in the longitudinal direction (travel direction) for each of the magnetic recording medium 10 and the base substrate 11.

(SFD)

Figure 4:
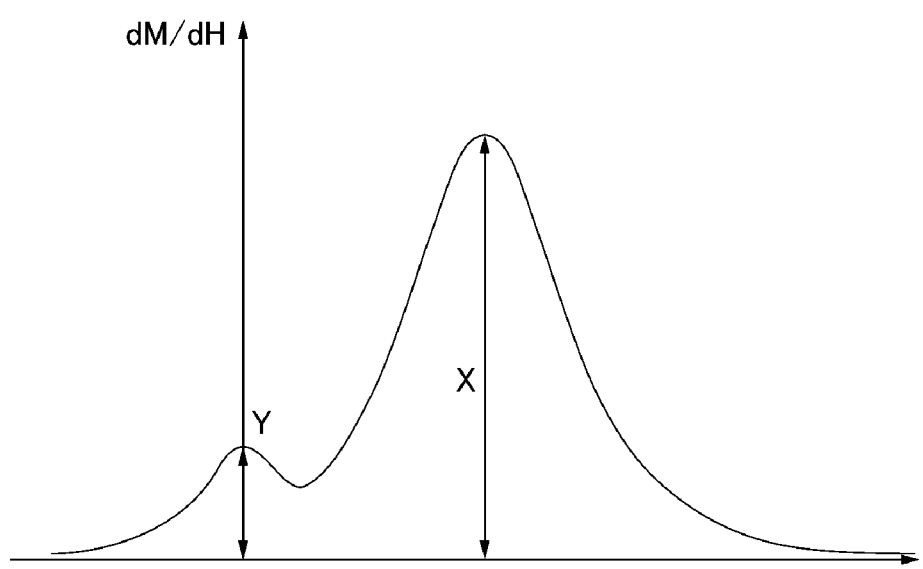
FIG. 4 is a graph illustrating an exemplary SFD curved line.

In a switching field distribution (SFD) curved line of the magnetic recording medium 10, a peak ratio X/Y between a main peak height X and a height Y of a sub-peak near zero of a magnetizing field is preferably 3.0 or more, more preferably 5.0 or more, and still more preferably 7.0 or more, particularly preferably 10.0 or more, and most preferably 20.0 or more (see FIG. 4). When the peak ratio X/Y is 3.0 or more, the magnetic powder can be prevented from including a large amount of a low-coercivity component unique to the ε-iron oxide (for example, a soft magnetic particle, a superparamagnetic particle, and the like), besides the ε-iron oxide particle contributing to actual recording. Therefore, it is possible to suppress deterioration of a magnetization signal recorded in an adjacent track due to magnetic field leakage from the recording head, and therefore, a better SNR can be achieved. An upper limit value of the peak ratio X/Y is not particularly limited but is 100 or less, for example.

The above peak ratio X/Y is obtained as follows. First, similarly to the above-described method of measuring the squareness ratio S1, an M-H loop after the background correction is obtained. Next, an SFD curve is calculated from the obtained M-H loop. To calculate the SFD curve, a program attached to a measuring machine may be used, or another program may also be used. The peak ration X/Y is calculated while setting an absolute value of a point where the calculated SFD curve crosses a Y axis (dM/dH) as "Y" and setting the height of the main peak seen near the coercive force Hc in the M-H loop as "X". Note that the measurement of the M-H loop is performed at 25° C. in a manner similar to the above-described method of measuring the coercive force Hc. Additionally, assume that the "demagnetic field correction" is not performed at the time of measuring the M-H loop in the thickness direction (vertical direction) of the magnetic recording medium 10.

(Activation Volume $V_{act}$)

An activation volume $V_{act}$ is preferably 8000 nm$^3$ or less, more preferably 6000 nm$^3$ or less, still more preferably 5000 nm$^3$ or less, particularly preferably 4000 nm$^3$ or less, and most preferably 3000 nm$^3$ or less. When the activation volume $V_{act}$ is 8000 nm$^3$ or less, a dispersion state of the magnetic powder becomes excellent, and therefore, a bit inversion region can be made steep, and deterioration of a magnetization signal recorded in an adjacent track due to the magnetic field leakage from the recording head can be suppressed. Therefore, there is a possibility that a better SNR cannot be obtained.

The above-described activation volume $V_{act}$ is obtained by an equation below derived by Street & Woolley.

$$V_{act}(\text{nm}^3) = k_B \times T \times X_{irr}/(\mu_0 \times Ms \times S)$$

(where, $k_B$: Boltzmann's constant (1.38×10$^{-23}$ J/K), T: temperature (K), $X_{irr}$: irreversible magnetic susceptibility, $\mu_0$: vacuum magnetic permeability, S: magnetic viscosity coefficient, and Ms: saturation magnetization (emu/cm$^3$))

The irreversible magnetic susceptibility $X_{irr}$, the saturation magnetization Ms, and the magnetic viscosity coefficient S to be substituted in the above equation are obtained by using the VSM as follows. Note that a measurement direction by the VSM is the thickness direction (vertical direction) of the magnetic recording medium 10. Additionally, assume that the measurement by the VSM is performed at 25° C. for a measurement sample cut out from the long-shaped magnetic recording medium 10. Additionally, assume that the "demagnetic field correction" is not performed at the time of measuring the M-H loop in the thickness direction (vertical direction) of the magnetic recording medium 10.

(Irreversible Magnetic Susceptibility $X_{irr}$)

The irreversible magnetic susceptibility $X_{irr}$ is defined as an inclination near residual coercive force Hr in an inclination of a residual magnetization curved line (DCD curved line). First, a magnetic field of −1193 kA/m (15 kOe) is applied to the entire magnetic recording medium 10, and the magnetic field is returned to zero to achieve a residual magnetization state. Thereafter, a magnetic field of about 15.9 kA/m (200 Oe) is applied in an opposite direction, the magnetic field is returned to zero again, and a residual magnetization amount is measured. After that, in a similar manner, the measurement in which the magnetic field larger than the above-described applied magnetic field by 15.9 kA/m is applied and the magnetic field is returned to zero is repeatedly performed, and the DCD curved line is measured by plotting residual magnetization amounts relative to the applied magnetic fields. From the obtained DCD curved line, a point at which the magnetization amount becomes zero is defined as the residual coercive force Hr, and the DCD curved line is further differentiated to obtain an inclination of the DCD curved line in each magnetic field. In the inclination of this DCD curved line, an inclination near the residual coercive force Hr becomes $X_{irr}$.

(Saturation Magnetization Ms)

First, similarly to the above-described method of measuring the squareness ratio S1, an M-H loop after the background correction is obtained. Next, Ms (emu/cm³) is calculated from a value of the saturation magnetization Ms (emu) of the obtained M-H loop and a volume (cm³) of the magnetic layer 13 inside the measurement sample. Note that the volume of the magnetic layer 13 can be obtained by multiplying the area of the measurement sample by the average thickness of the magnetic layer 13. The method of calculating the average thickness of the magnetic layer 13 necessary for calculating the volume of the magnetic layer 13 is as described above.

(Magnetic Viscosity Coefficient S)

First, a magnetic field of −1193 kA/m (15 kOe) is applied to the entire magnetic recording medium 10 (measurement sample), and the magnetic field is returned to zero to achieve a residual magnetization state. Thereafter, a magnetic field equivalent to a value of the residual coercive force Hr obtained from the DCD curved line is applied in an opposite direction. A magnetization amount is continuously measured at constant time intervals for 1000 seconds in the state of applying the magnetic field. A relation between time (t) and the magnetization amount M(t) thus obtained is collated with an equation below to calculate the magnetic viscosity coefficient S.

$$M(t)=M0+S\times\ln(t)$$

(where M(t): magnetization amount at time t, M0: initial magnetization amount, S: magnetic viscosity coefficient, and ln(t): natural logarithm of time)

(Dimensional Change Amount Δw)

A dimensional change amount Δw in the width direction of the magnetic recording medium 10 with respect to a tension change in the longitudinal direction of the magnetic recording medium 10 preferably satisfies 700 [ppm/N]≤Δw, more preferably 750 [ppm/N]≤Δw, and still more preferably, 800 [ppm/N]≤Δw. When the dimensional change amount Δw indicates the relation of Δw<700 [ppm/N], there is a possibility that the change in the width is hardly suppressed by tension adjustment in the longitudinal direction by the recording/reproducing apparatus. An upper limit value of the dimensional change amount Δw is not particularly limited but satisfies Δw<1700000 [ppm/N], preferably Δw<20000 [ppm/N], and more preferably Δw<8000 [ppm/N], for example.

The dimensional change amount Δw is obtained as follows. First, the magnetic recording medium 10 having a ½-inch width is prepared and then cut into a length of 250 mm to produce a sample 10S. Next, a load is applied in the order of 0.2 N, 0.6 N and 1.0 N in the longitudinal direction of the sample 10S, and widths of the sample 10S are measured at the time of applying the loads of 0.2N and 1.0 N. Subsequently, the dimensional change amount Δw is obtained from an equation below:

$$\Delta w[ppm/N] = \frac{D(0.2N)[mm] - D(1.0N)[mm]}{D(0.2N)[mm]} \times \frac{1{,}000{,}000}{(1.0[N]) - (0.2[N])} \qquad [\text{Math. 1}]$$

(where D(0.2 N) and D(1.0 N) in the equation represent the widths of the sample 10S at the time of applying the loads of 0.2 N and 1.0 N in the longitudinal direction of the sample 10S).

Figure 5:
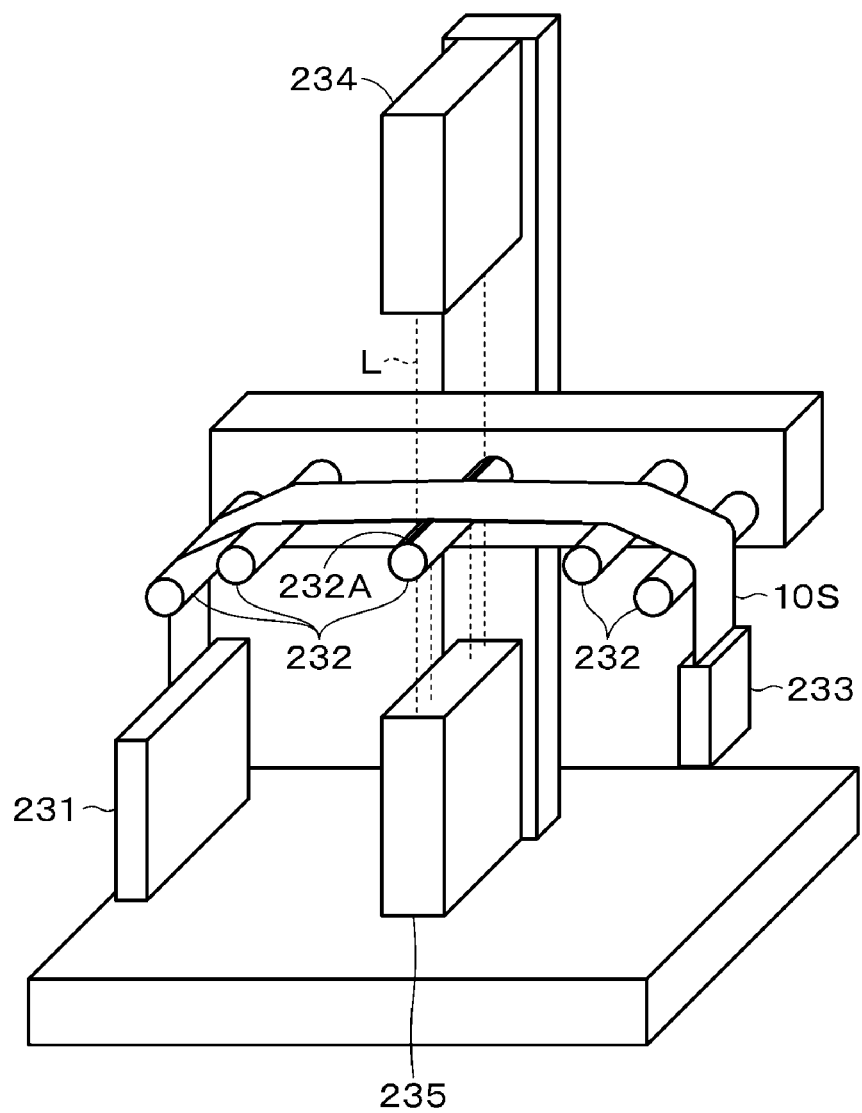
FIG. 5 is a perspective view of a measuring device to measure a width of a sample when a load is applied.

Note that the widths of the sample 10S at the time of applying the respective loads are measured as follows. First, the measuring device incorporated with a laser digital micrometer LS-7000 manufactured by Keyence Corporation as a measuring device, which is illustrated in FIG. 5, is prepared and the sample 10S is set in this measuring device. Specifically, one end of the long-shaped sample (magnetic recording medium) 10S is fixed by a fixing portion 231, and the sample 10S is bridged across a plurality of rod-like support members 232. Among the support members 232, note that a slit 232A is provided in a support member 232 located between a light emitter 234 and a light receiver 235, and light L is emitted from the light emitter 234 to the light receiver 235 through the slit 232A.

Subsequently, after the measuring device is housed inside a chamber controlled to be constant environment having temperature of 25° C. and relative humidity of 50%, a weight 233 is attached to the other end of the sample 10S, and the sample 10S is made to become accustomed to the above-described environment. A load applied in the longitudinal direction of the sample 10S can be changed by adjusting the weight of the weight 233. Thereafter, the light L is emitted from the light emitter 234 toward the light receiver 235, and the width of the sample 10S applied with the load in the longitudinal direction is measured. The light emitter 234 and the light receiver 235 are provided in the digital micrometer LS-7000.

(Thermal Expansion Coefficient α)

A thermal expansion coefficient α of the magnetic recording medium 10 preferably satisfies 6 [ppm/° C.]≤α≤8 [ppm/° C.]. When the thermal expansion coefficient α is in the above range, a change in the width of the magnetic recording medium 10 can be further suppressed by adjusting the tension in the longitudinal direction of the magnetic recording medium 10 by the recording/reproducing apparatus.

The thermal expansion coefficient α is obtained as follows. First, a sample 10S is produced in a manner similar to the method of measuring the dimensional change amount Δw, the sample 10S is set in the measuring device similar to that in the method of measuring the dimensional change amount Δw, and the measuring device is housed inside the chamber controlled to be constant environment having temperature 29° C. and relative humidity 24%. Next, a load of 0.2 N is applied in the longitudinal direction of the sample 10S, and the sample 10S is made to become accustomed to the above environment. Thereafter, the temperature is changed in the order of 45° C., 29° C., and 10° C. while keeping the relative humidity of 24%, the width of the sample 10S is measured at 45° C. and 10° C., and the thermal expansion coefficient α is obtained by an equation below:

$$\alpha[ppm/°C] = \quad \text{[Math. 2]}$$

$$\frac{D(45°C)[mm] - D(10°C)[mm]}{D(10°C)[mm]} \times \frac{1,000,000}{(45[°C]) - (10[°C])}$$

(where D(45° C.) and D(10° C.) in the equation respectively represent widths of the sample 10S at the temperature of 45° C. and 10° C.).

(Humidity Expansion Coefficient β)

A humidity expansion coefficient β of the magnetic recording medium 10 preferably satisfies β≤5 [ppm/% RH]. When the humidity expansion coefficient β is in the above range, it is possible to further suppress a change in the width of the magnetic recording medium 10 by adjusting the tension in the longitudinal direction of the magnetic recording medium 10 by the recording/reproducing apparatus.

The humidity expansion coefficient β is obtained as follows. First, a sample 10S is produced in a manner similar to the method of measuring the dimensional change amount Δw, the sample 10S is set in the measuring device similar to that in the method of measuring the dimensional change amount Δw, and the measuring device is housed inside the chamber controlled to be constant environment having temperature 29° C. and relative humidity 24%. Next, a load of 0.2 N is applied in the longitudinal direction of the sample 10S, and the sample is made to become accustomed to the above environment. Thereafter, the humidity is changed in the order of 80%, 24%, and 10% while keeping the temperature at 29° C., the width of the sample 10S is measured at 80% and 10%, and the humidity expansion coefficient β is obtained by an equation below:

$$\beta[ppm/\%RH] = \quad \text{[Math. 3]}$$

$$\frac{D(80\%)[mm] - D(10\%)[mm]}{D(10\%)[mm]} \times \frac{1,000,000}{(80[\%]) - (10[\%])}$$

(where D(80%) and D(10%) in the equation represent the widths of the sample 10S at temperature of 80% and temperature of 10%, respectively).

(Poisson Ratio ρ)

A Poisson ratio ρ of the magnetic recording medium 10 preferably satisfies 0.3≤ρ. When the Poisson ratio ρ is in the above range, it is possible to further suppress a change in the width of the magnetic recording medium 10 by adjusting the tension in the longitudinal direction of the magnetic recording medium 10 by the recording/reproducing apparatus.

The Poisson ratio ρ is obtained as follows. First, the magnetic recording medium 10 having a ½-inch width is prepared, cut into a length of 150 mm to produce a sample, and then a mark of a size of 6 mm×6 mm is provided at a center portion of the sample. Next, both end portions in the longitudinal direction of the sample are chucked such that a chuck interval becomes 100 mm, an initial load of 2 N is applied, a length of the mark in the longitudinal direction of the sample at this time is defined as an initial length, and the width of the mark in the width direction of the sample is defined as an initial width. Subsequently, the sample is pulled by an instron type universal tensile testing device at a tension rate of 0.5 mm/min, and a dimensional change amount in each of the length of the mark in the longitudinal direction of the sample and the width of the mark in the width direction of the sample are measured by an image sensor manufactured by Keyence Corporation. Thereafter, the Poisson's ratio ρ is obtained from an equation below:

$$\rho = \frac{\left\{\frac{\text{dimensional change amount in mark width [mm]}}{\text{initial width [mm]}}\right\}}{\left\{\frac{\text{dimensional change amount in mark length [mm]}}{\text{initial length [mm]}}\right\}} \quad \text{[Math. 4]}$$

(Elastic Limit Value $\sigma_{MD}$ in Longitudinal Direction)

An elastic limit value $\sigma_{MD}$ in the longitudinal direction of the magnetic recording medium 10 preferably satisfies 0.8 [N]≤$\sigma_{MD}$. When the elastic limit value $\sigma_{MD}$ is in the above range, it is possible to further suppress a change in the width of the magnetic recording medium 10 by adjusting the tension in the longitudinal direction of the magnetic recording medium 10 by the recording/reproducing apparatus. It is preferable that the elastic limit value amp be not dependent on a velocity V at the time of performing elasticity limit measurement. Since the elastic limit value amp is not dependent on the above-mentioned velocity V, a change in the width of the magnetic recording medium 10 can be effectively suppressed without receiving influence of a travel speed of the magnetic recording medium 10 in the recording/reproducing apparatus, a tension adjustment velocity in the recording/reproducing apparatus, and responsiveness thereof.

The elastic limit value GMD is obtained as follows. First, the magnetic recording medium 10 having a ½-inch width is prepared, cut out into a length of 150 mm to produce a sample, and both end portions in the longitudinal direction of the sample are chucked to the universal tensile testing device such that a chuck interval $\lambda_0$ becomes $\lambda_0$=100 mm Next, the sample is pulled at a tension rate of 0.5 mm/min, and a load σ [N] relative to the chuck interval λ [mm] is continuously measured. Subsequently, a relation between Δλ [%] and σ [N] is graphed by using the obtained data of λ [mm] and σ [N]. However, Δλ [%] is obtained by an equation below:

$$\Delta\lambda[\%]=((\lambda-\lambda0)/\lambda0)\times100.$$

Next, in the above-mentioned graph, a region where the graph has a straight line is calculated in a region of σ≥0.2 N, and a maximum load σ is defined as the elastic limit value $\sigma_{MD}$ [N].

A Young modulus ratio ($E_{TD}/E_{MD}$) between a Young modulus $E_{TD}$ in the width direction (transverse direction; TD) of the magnetic recording medium 10 and a Young modulus $E_{MD}$ in the longitudinal direction (machine direction; MD) of the magnetic recording medium 10 is preferably 1.5 or more and 2.0 or less, and more preferably 1.8 or more and 2.0 or less. When the Young modulus ratio ($E_{TD}/E_{MD}$) is 1.5 or more, rigidity in the width direction of the magnetic recording medium 10 is enhanced, and a dimensional change in the width direction caused by a change in temperature/humidity can be restrained (suppressed) by own rigidity, and as a result, an off-track characteristic can be improved. On the other hand, when the Young modulus ratio ($E_{TD}/E_{MD}$) is 2.0 or less, deterioration of an end portion (edge) shape of the magnetic recording medium 10 can be suppressed in the manufacturing process of the magnetic recording medium 10.

The Young modulus ratio ($E_{TD}/E_{MD}$) is obtained as follows. In measurement of the Young modulus $E_{MD}$, first, a small piece of the magnetic recording medium 10 is prepared, and jigs are attached to both end faces of the small piece corresponding to the longitudinal direction of the magnetic recording medium 10 and then the jigs are pulled. At this point, stress $\sigma_{MD}$ is calculated from a tensile load $F_{MD}$ and a cross-sectional area value A of the magnetic recording medium 10 (calculated from a width of the small piece of the magnetic recording medium 10 and an average thickness of the small piece), and a relation between the stress $\sigma_{MD}$ and distortion (i.e., dimensional change rate) $\varepsilon_{MD}$ of the small piece at the time of pulling at the same stress is obtained. Next, the Young modulus $E_{MD}$ is calculated from $E_{MD}=\sigma_{MD}/\varepsilon_{MD}$. Similarly, in measurement of the Young modulus $E_{TD}$, the jigs are first attached to both end faces of the small piece corresponding to the width direction of the magnetic recording medium 10 and pulled. At this time, stress $\sigma_{TD}$ is calculated from a tensile load $F_{TD}$ and a cross-sectional area value A of the magnetic recording medium 10 (calculated from a width of the small piece of the magnetic recording medium 10 and the average thickness of the small piece), and a relation between the stress $\sigma_{TD}$ and distortion (i.e., dimensional change) $E_{TD}$ of the small piece at the time of pulling with the same stress is obtained. Next, the Young modulus $E_{TD}$ is calculated from $E_{TD}=\sigma_{TD}/\varepsilon_{TD}$. The Young modulus ratio ($E_{TD}/E_{MD}$) is calculated by using the $E_{MD}$ and $E_{TD}$ obtained as described above. Note that the average thickness of the small piece used in the above calculation is obtained in a manner similar to the above-described average thickness of the magnetic recording medium 10.

2. METHOD OF MANUFACTURING MAGNETIC RECORDING MEDIUM

Next, a method of manufacturing the magnetic recording medium 10 having the above-described configuration will be described. First, a coating material for the foundation layer formation is fabricated by kneading and dispersing the non-magnetic powder, the binding agent, and the like in a solvent. Next, a coating material for the magnetic layer formation is fabricated by kneading and dispersing the magnetic powder, the binding agent, and the like in a solvent. In the fabrication of the coating material for the magnetic layer formation and the coating material for the foundation layer formation, solvents, dispersing devices, and kneading devices specified below, for example, can be used.

Examples of the solvent used for the fabrication of the above-mentioned coating materials can include ketone-based solvents such as acetone, methyl ethyl ketone, methyl isobutyl ketone, and cyclohexanone, alcohol-based solvents such as methanol, ethanol, and propanol, ester-based solvents such as methyl acetate, ethyl acetate, butyl acetate, propyl acetate, ethyl lactate, and ethylene glycol acetate, ether-based solvents such as diethylene glycol dimethyl ether, 2-ethoxyethanol, tetrahydrofuran, and dioxane, aromatic hydrocarbon-based solvents such as benzene, toluene, and xylene, halogenated hydrocarbon-based solvents such as methylene chloride, ethylene chloride, carbon tetrachloride, chloroform, and chlorobenzene, and the like. These may be used alone, or may be used in combination as appropriate.

As the kneading device used for fabricating the above-described coating materials, for example, kneading devices such as a continuous twin-screw kneader, a continuous twin-screw kneader capable of performing dilution in multiple steps, a kneader, a pressurizing kneader, and a roll kneader may be used, but the kneading device is not particularly limited to these devices. Additionally, as the dispersion device used for fabricating the above-described coating materials, for example, dispersion devices such as a roll mill, a ball mill, a horizontal sand mill, a vertical sand mill, a spike mill, a pin mill, a tower mill, a pearl mill (e.g., "DCP mill" manufactured by Maschinenfabrik Gustav Eirich GmbH & Co KG, and the like), a homogenizer, and an ultrasonic disperser may be used, but the dispersion device is not particularly limited to these devices.

Next, the foundation layer 12 is formed by applying the coating material for the foundation layer formation to one main surface of the base substrate 11 and drying the coating material. Subsequently, the magnetic layer 13 is formed on the foundation layer 12 by applying the coating material for the magnetic layer formation to the foundation layer 12 and drying the coating material. Note that a magnetizing field of the magnetic powder is oriented in the thickness direction of the base substrate 11 by, for example, a solenoid coil at the time of drying. Also, the magnetizing field of the magnetic powder may be oriented in the travel direction (longitudinal direction) of the base substrate 11 at the time of drying and then the magnetizing field is oriented in the thickness direction of the base substrate 11 by, for example, the solenoid coil. Thus, a degree of the vertical orientation (i.e., squareness ratio S1) of the magnetic powder can be further improved by performing the processing in which the magnetic powder is once oriented in the longitudinal direction. After formation of the magnetic layer 13, the back layer 14 is formed on the other main surface of the base substrate 11. With the above-described processing, the magnetic recording medium 10 can be obtained.

The squareness ratios S1 and S2 are set to desired values by adjusting, for example, strength of a magnetizing field applied to a coating film of the coating material for the magnetic layer formation, a concentration of solid content in the coating material for the magnetic layer formation, drying conditions (drying temperature and drying period) for the coating film of the coating material for the magnetic layer formation. The strength of the magnetizing field applied to the coating film is preferably twice or more and 3 times or less the coercive force of the magnetic powder. To further increase the squareness ratio S1 (in other words, to further decrease the squareness ratio S2), it is preferable to improve the dispersion state of the magnetic powder in the coating material for the magnetic layer formation. Also, to further increase the squareness ratio S1, it is also effective to magnetize the magnetic powder in a stage before putting the coating material for the magnetic layer formation into an orientating device used to orient the magnetizing field of the magnetic powder. Note that the above-described adjustment methods for the squareness ratio S1 and S2 may be used alone, or two or more methods may be used in combination.

Thereafter, the obtained magnetic recording medium 10 is rewound around a large-diameter core, and hardening treatment is applied. Finally, the magnetic recording medium 10 is subjected to calendering treatment, and cut into a predetermined width (e.g., ½-inch width). With the above-processing, the intended long-shaped magnetic recording medium 10 can be obtained.

3. CONFIGURATION OF RECORDING/REPRODUCING APPARATUS

Next, a configuration of a recording/reproducing apparatus 30 that performs recording and reproducing in the magnetic recording medium 10 having the above-described configuration will be described with reference to FIG. 6.

The recording/reproducing apparatus 30 has the configuration capable of adjusting tension applied in the longitudinal direction of the magnetic recording medium 10. Additionally, the recording/reproducing apparatus 30 has a configuration that can mount a magnetic recording medium cartridge 10A. Here, a case where the recording/reproducing apparatus 30 has the configuration that can mount one magnetic recording medium cartridge 10A will be described in order to simplify the description, but the recording/reproducing apparatus 30 may also have a configuration that can mount a plurality of magnetic recording medium cartridges 10A.

The recording/reproducing apparatus 30 is connected to information processing apparatuses such as a server 41 and a personal computer (hereinafter referred to as "PC") 42 via a network 43 and can record, in the magnetic recording medium cartridge 10A, data supplied from these information processing apparatuses.

Figure 6:
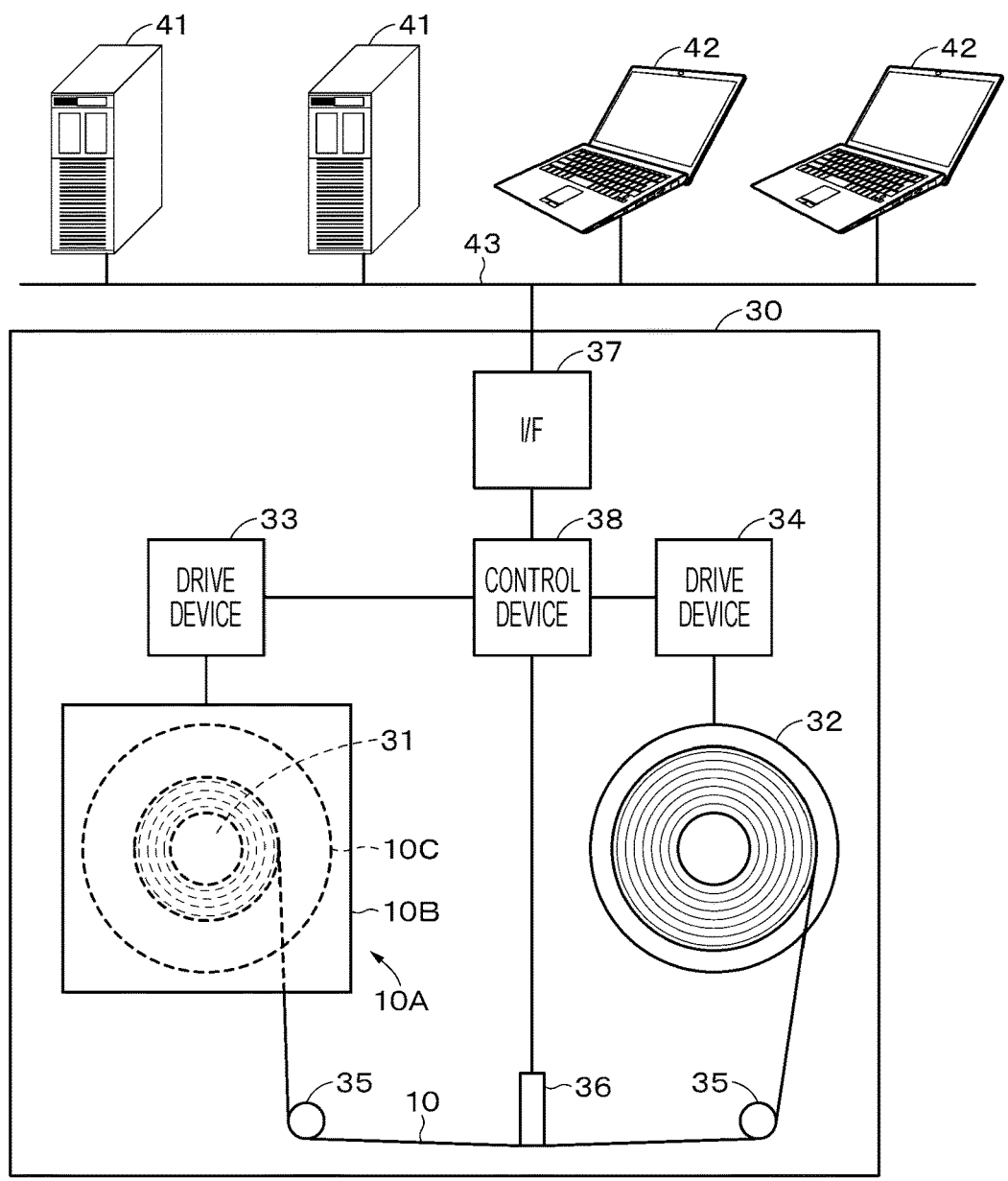
FIG. 6 is a schematic view of a recording/reproducing apparatus.

As illustrated in FIG. 6, the recording/reproducing apparatus includes a spindle 31, a reel 32 on the recording/reproducing apparatus side, a spindle drive device 33, a reel drive device 34, a plurality of guide rollers 35, and a head unit 36, a communication interface (hereinafter, I/F) 37, and a control device 38.

In the spindle 31, the magnetic recording medium cartridge 10A can be attached. The magnetic recording medium cartridge 10A conforms to the linear tape open (LTO) standards and rotatably houses, in a cartridge case 10B, a single reel 10C around which the magnetic recording medium 10 is wounded. In the magnetic recording medium 10, a servo pattern having a chevron-like shape is recorded in advance as a servo signal. The reel 32 can fix a leading end of the magnetic recording medium 10 drawn out from the magnetic recording medium cartridge 10A.

The spindle drive device 33 is a device that rotationally drives the spindle 31. The reel drive device 34 is a device that rotationally drives the reel 32. When data is recorded in or reproduced from the magnetic recording medium 10, the magnetic recording medium 10 is made to travel by rotational drive of the spindle 31 and the reel 32 by the spindle drive device 33 and the reel drive device 34. The guide rollers 35 are rollers to guide the travel of the magnetic recording medium 10.

The head unit 36 includes: a plurality of recording heads to record data signals in the magnetic recording medium 10; a plurality of reproducing heads to reproduce the data signal recorded in the magnetic recording medium 10; and a plurality of servo heads to reproduce servo signals recorded in the magnetic recording medium 10. As the recording head, for example, a ring type head can be used, but a kind of the recording head is not limited thereto.

The communication I/F 37 is used to communicate with the information processing apparatuses such as the server 41 and the PC 42, and is connected to the network 43.

The control device 38 controls the entire recording/reproducing apparatus 30. For example, in response to a request from the information processing apparatuses such as the server 41 and the PC 42, the control device 38 records, in the magnetic recording medium 10 by the head unit 36, a data signal supplied from the information processing apparatuses. Additionally, the control device 38 reproduces, by the head unit 36, the data signals recorded on the magnetic recording medium 10 and supplies the data signals to the information processing apparatuses in response to a request from the information processing apparatuses such as the server 41 and the PC 42.

Additionally, the control device 38 detects a change in the width of the magnetic recording medium 10 on the basis of a servo signal supplied from the head unit 36. Specifically, a plurality of servo patterns each having the chevron-like shape is recorded in the magnetic recording medium 10 as servo signals, and the head unit 36 uses two servo heads on the head unit 36 to reproduce two different servo patterns at the same time, and can obtain the respective servo signals. A position of the head unit 36 is controlled so as to follow the servo patterns by using relative position information between the servo patterns and the head unit obtained from the servo signals. At the same time, distance information between the servo patterns can also be obtained by comparing waveforms of two servo signals. By comparing the distance information between the servo patterns obtained at the time of every measurement, it is possible to obtain a change in a distance between the servo patterns at the time of every measurement. The change in the width of the magnetic recording medium 10 can also be calculated by further considering the distance information between the servo patterns at the time of servo pattern recording in addition to this. The control device 38 controls the rotational drive of the spindle drive device 33 and the reel drive device 34 on the basis of the change in the distance between the servo patterns obtained as described above or a calculated change in the width of the magnetic recording medium 10, and adjusts the tension in the longitudinal direction of the magnetic recording medium 10 such that the width of the magnetic recording medium 10 becomes a prescribed width or a substantially prescribed width. With this tension adjustment, the change in the width of the magnetic recording medium 10 can be suppressed.

4. OPERATION OF RECORDING/REPRODUCING APPARATUS

Next, operation of the recording/reproducing apparatus 30 having the above configuration will be described.

First, the magnetic recording medium cartridge 10A is mounted on the recording/reproducing apparatus 30, the leading end of the magnetic recording medium 10 is drawn out and fed to the reel 32 via the plurality of guide rollers 35 and the head unit 36, and the leading end of the magnetic recording medium 10 is set to the reel 32.

Next, when an operating portion (not illustrated) is operated, the spindle drive device 33 and the reel drive device 34 are driven under control of the control device 38, and the spindle 31 and the reel 32 are rotated in the same direction such that the magnetic recording medium 10 is made to travel from the reel 10C to the reel 32. With this rotation, while the magnetic recording medium 10 is wounded around the reel 32, the head unit 36 records information in the magnetic recording medium 10 or reproduces information recorded in the magnetic recording medium 10. At this point, the control device 38 controls the rotational drive for each of the spindle drive device 33 and the reel drive device 34 and adjusts the tension in the longitudinal direction of the magnetic recording medium 10 such that the width of the magnetic recording medium 10 becomes the prescribed width or the substantially prescribed width.

Additionally, in a case of rewinding the magnetic recording medium 10 to the reel 10C, the magnetic recording medium 10 is made to travel from the reel 32 to the reel 10C by rotationally driving the spindle 31 and the reel 32 in the direction opposite to the above-described direction. At the time of this rewinding also, information is recorded in the magnetic recording medium 10 or information recorded in the magnetic recording medium 10 is reproduced by the head unit 36. Additionally, the tension in the longitudinal direction of the magnetic recording medium 10 is adjusted by the control device 38.

5. EFFECTS

In the magnetic recording medium 10 according to the embodiment, $w_{max}$ and $w_{min}$ satisfy the above-described Relational Expression (1) in the case of defining, as $w_{max}$ and $w_{min}$ respectively, the maximum value and the minimum value out of the average values of the width of the magnetic recording medium 10 measured under the four kinds of environment in which the temperature and the relative humidity are set to (10° C., 10%), (10° C., 80%), (29° C., 80%), and (45° C., 10%). With satisfaction of the Relational Expression, off-tracking can be suppressed in the magnetic recording medium 10 having the data track width W of 2900 nm or less.

6. MODIFIED EXAMPLES

Modified Example 1

Figure 7:
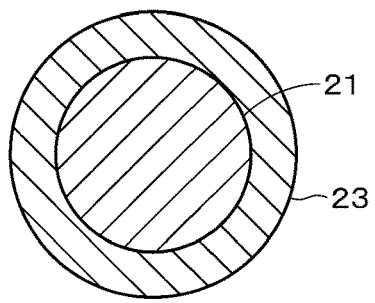
FIG. 7 is a cross-sectional view of a magnetic particle in a modified example.

In the above-described embodiment, the case where the ε-iron oxide particle includes the shell portion 22 having the two-layer structure is described, but as illustrated in FIG. 7, the ε-iron oxide particle may include a shell portion 23 having a single-layer structure. In this case, the shell portion 23 has a configuration similar to the first shell portion 22a. However, the ε-iron oxide particle preferably has the shell portion 22 having the two-layer structure like the above-described embodiment from the viewpoint of suppressing characteristic deterioration of the ε-iron oxide particles.

Modified Example 2

In the above-described embodiment, the case where the ε-iron oxide particle includes the core-shell structure is described, but the ε-iron oxide particle may include an additive instead of the core-shell structure or may include the core-shell structure and further include the additive. In this case, a part of Fe of the ε-iron oxide particle is substituted with the additive. Since the coercive force Hc of the entire ε-iron oxide particle can be adjusted to the coercive force Hc suitable for recording also by the ε-iron oxide particle including the additive, recording performance can be improved. The additive is a metal element other than iron, preferably a trivalent metal element, more preferably at least one kind out of Al, Ga, or In, and still more preferably at least one kind out of Al or Ga.

Specifically, the ε-iron oxide including the additive is a ε-$Fe_{2-x}M_xO_3$ crystal (where M is a metal element other than iron, preferably a trivalent metal element, more preferably at least one kind out of Al, Ga, or In, and still more preferably at least one kind out of Al or Ga, x satisfies 0<x<1, for example).

Modified Example 3

The magnetic powder may include powder of a nanoparticle containing hexagonal ferrite (hereinafter referred to as "hexagonal ferrite particle") instead of the powder of the ε-iron oxide particle. The hexagonal ferrite particle has a hexagonal plate-like shape or a substantially hexagonal plate-like shape, for example. The hexagonal ferrite preferably includes at least one kind out of Ba, Sr, Pb, or Ca, more preferably, at least one kind out of Ba or Sr. Specifically, the hexagonal ferrite may be, for example, barium ferrite or strontium ferrite. The barium ferrite may further include at least one kind out of Sr, Pb, or Ca besides Ba. The strontium ferrite may further include at least one kind out of Ba, Pb, or Ca besides Sr.

More specifically, the hexagonal ferrite includes an average composition represented by a general formula $MFe_{12}O_{19}$. However, M is, for example, at least one kind of metal out of Ba, Sr, Pb or Ca, preferably, at least one kind of metal out of Ba or Sr. M may also be a combination of Ba and one or more kinds of metals selected from a group including Sr, Pb, and Ca. Also, M may be a combination of Sr and one or more kinds of metals selected from a group including Ba, Pb, and Ca. A part of Fe in the above general formula may be substituted with another metal element.

In a case where the magnetic powder includes powder of the hexagonal ferrite particles, an average particle size of the magnetic powder is preferably 30 nm or less, more preferably 12 nm or more and 25 nm or less, still more preferably 15 nm or more and 22 nm or less, particularly preferably 15 nm or more and 20 nm or less, and most preferably 15 nm or more and 18 nm or less. When the average particle size of the magnetic powder is 30 nm or less, an excellent electromagnetic conversion characteristic (e.g., SNR) can be obtained in the magnetic recording medium 10 having the high recording density. On the other hand, when the average particle size of the magnetic powder is 12 nm or more, dispersibility of the magnetic powder is further improved, and the more excellent electromagnetic conversion characteristic (e.g., SNR) can be achieved. In the case where the magnetic powder includes powder of the hexagonal ferrite particles, an average aspect ratio of the magnetic powder is similar to that of the above-described one embodiment.

Note that the average particle size and the average aspect ratio of the magnetic powder can be obtained as follows. First, the magnetic recording medium 10 to be measured is processed by the FIB process or the like to produce a thin piece, and a cross section of the thin piece is observed by the TEM. Next, fifty pieces of magnetic powder oriented at an angle of 75 degrees or more with respect to a horizontal direction are randomly selected from a photographed TEM photograph, and a maximum plate thickness DA of each of the pieces of the magnetic powder is measured. Subsequently, an average maximum plate thickness DAave is obtained by simply averaging the maximum plate thicknesses DA of the measured fifty pieces of the magnetic powder (arithmetic average).

Next, the surface of the magnetic layer 13 of the magnetic recording medium 10 is observed by the TEM. Next, fifty pieces of magnetic powder are randomly selected from the photographed TEM photograph, and a maximum plate diameter DB of each of the pieces of the magnetic powder is measured. Here, the maximum plate diameter DB means a largest distance (so-called maximum Feret diameter) out of distances between two parallel lines drawn from all angles in a manner contacting the contour of the magnetic powder. Subsequently, an average maximum plate diameter DBave is obtained by simply averaging the maximum plate diameters DB of the measured fifty pieces of the magnetic powder (arithmetic average). The average maximum plate diameter DBave thus obtained is defined as an average particle size of the magnetic powder. Next, an average aspect ratio (DBave/

DAave) of the magnetic powder is obtained from the average maximum plate thickness DAave and the average maximum plate diameter DBave.

In a case where the magnetic powder includes powder of the hexagonal ferrite particles, an average particle volume of the magnetic powder is preferably 5900 nm$^3$ or less, more preferably 500 nm$^3$ or more and 3400 nm$^3$ or less, still more preferably 1000 nm$^3$ or more and 2500 nm$^3$ or less, particularly preferably 1000 nm$^3$ or more and 1800 nm$^3$ or less, and most preferably 1000 nm$^3$ or more and 1500 nm$^3$ or less. When the average particle volume of the magnetic powder is 5900 nm$^3$ or less, it is possible to achieve an effect similar to that in a case where the average particle size of the magnetic powder is 30 nm or less. On the other hand, when the average particle volume of the magnetic powder is 500 nm$^3$ or more, it is possible to achieve an effect similar to that in a case where the average particle size of the magnetic powder is 12 nm or more.

Note that the average particle volume of the magnetic powder is obtained as follows. First, the average maximum plate thickness DAave and the average maximum plate diameter DBave are obtained in a manner similar to the above-described method of calculating the average particle size of the magnetic powder. Next, an average particle volume V of the magnetic powder is obtained by an equation below:

$$V = 3\sqrt{3}/8 \times DAave \times DBave^2.$$

Modified Example 4

The magnetic powder may include powder of a nanoparticle containing Co-containing spinel ferrite (hereinafter referred to as "cobalt ferrite particle") instead of the powder of the ε-iron oxide particle. The cobalt ferrite particle preferably has uniaxial anisotropy. The cobalt ferrite particle has a cubic shape or a substantially cubic shape, for example. The Co-containing spinel ferrite may further include at least one kind out of Ni, Mn, Al, Cu, or Zn besides Co.

The Co-containing spinel ferrite has, for example, an average composition represented by the following Formula (1).

$$Co_xM_yFe_2O_z \qquad (1)$$

(where M in Formula (1) is at least one kind of metal out of, for example, Ni, Mn, Al, Cu, or Zn. x is a value within a range of 0.4≤x≤1.0. y is a value within a range of 0≤y≤0.3. However, x and y satisfy a relation of (x+y)≤1.0. z is a value within a range of 3≤z≤4. A part of Fe may be substituted with another metal element.)

In a case where the magnetic powder includes the powder of the cobalt ferrite particles, an average particle size of the magnetic powder is preferably 25 nm or less, more preferably 8 nm or more and 23 nm or less, still more preferably 8 nm or more and 12 nm or less, and particularly preferably 8 nm or more and 11 nm or less. When the average particle size of the magnetic powder is 25 nm or less, an excellent electromagnetic conversion characteristic (e.g., SNR) can be obtained in the magnetic recording medium 10 having the high recording density. On the other hand, when the average particle size of the magnetic powder is 8 nm or more, dispersibility of the magnetic powder is further improved, and the more excellent electromagnetic conversion characteristic (e.g., SNR) can be achieved. Additionally, in a case where the magnetic powder includes the powder of cobalt ferrite particles, an average aspect ratio of the magnetic powder is similar to that of the above-described one embodiment. Note that the average particle size and the average aspect ratio of the magnetic powder can be obtained in a manner similar to the above-described embodiment.

An average particle volume of the magnetic powder is preferably 15000 nm$^3$ or less, more preferably 500 nm$^3$ or more and 12000 nm$^3$ or less, particularly preferably 500 nm$^3$ or more and 1800 nm$^3$ or less, and most preferably 500 nm$^3$ or more and 1500 nm$^3$ or less. When the average particle volume of the magnetic powder is 15000 nm$^3$ or less, it is possible to achieve an effect similar to that in a case where the average particle size of the magnetic powder is 25 nm or less. On the other hand, when the average particle volume of the magnetic powder is 500 nm$^3$ or more, it is possible to achieve an effect similar to that in the case where the average particle size of the magnetic powder is 8 nm or more. Note that the average particle volume of the magnetic powder is similar to the method of calculating the average particle volume of the magnetic powder in the above-described embodiment (method of calculating the average particle volume in the case where the ε-iron oxide particle has the cubic shape or the substantially cubic shape).

Modified Example 5

Figure 8:
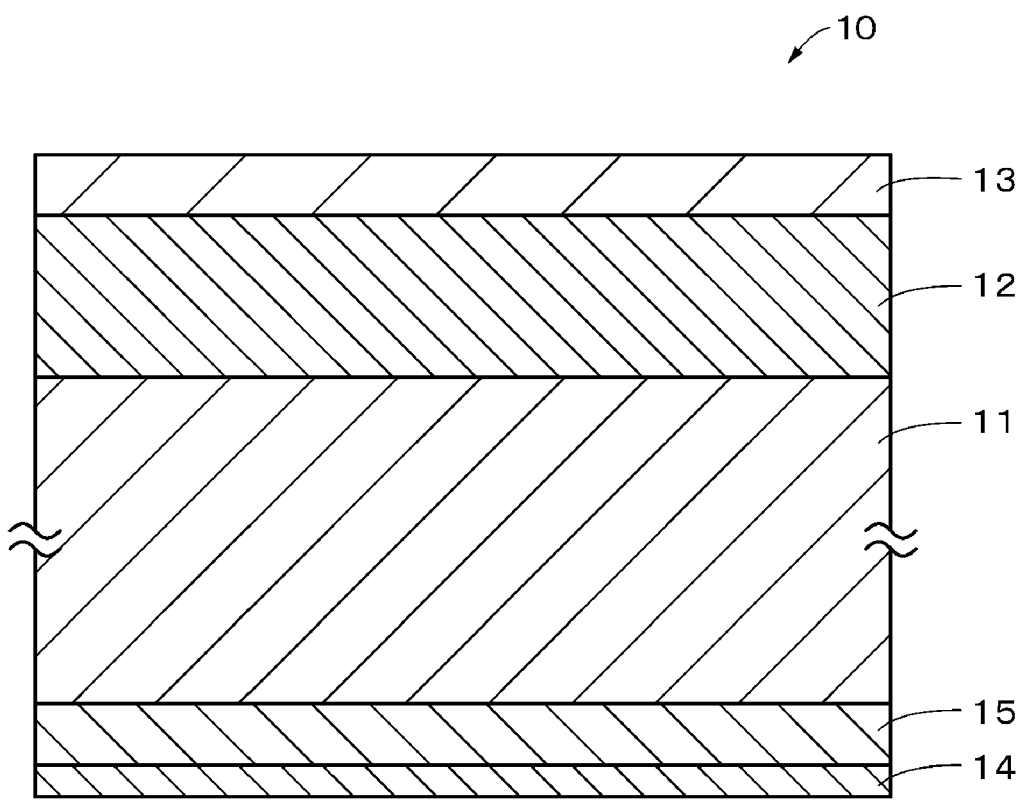
FIG. 8 is a cross-sectional view of a magnetic recording medium in a modified example.

The magnetic recording medium 10 may further include a barrier layer 15 provided on at least one surface of the base substrate 11 as illustrated in FIG. 8. The barrier layer 15 is a layer to suppress a dimensional change in accordance with environment of the base substrate 11. For example, a hygroscopic property of the base substrate 11 is an exemplary cause of the dimensional change, a moisture penetration speed to the base substrate 11 can be slowed down by providing the barrier layer 15. The barrier layer 15 includes a metal or metal oxide, for example. As the metal, it is possible use at least one kind out of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta, for example. As the metal oxide, it is possible to use metal oxide including one kind or two or more kinds out of the above metals, for example. More specifically, at least one kind out of $Al_2O_3$, CuO, CoO, $SiO_2$, $Cr_2O_3$, $TiO_2$, $Ta_2O_5$, or $ZrO_2$ can be used, for example. Additionally, the barrier layer 15 may include diamond-like carbon (DLC), diamond, or the like.

An average thickness of the barrier layer 15 is preferably 20 nm or more and 1000 nm or less, more preferably 50 nm or more and 1000 nm or less. The average thickness of the barrier layer 15 is obtained in a manner similar to the average thickness of the magnetic layer 13. However, a magnification of a TEM image is appropriately adjusted in accordance with the thickness of the barrier layer 15.

Modified Example 6

The magnetic recording medium 10 according to the above-described embodiment may be used as a library device. In this case, the library device may include a plurality of recording/reproducing apparatuses 30 of the above-described embodiment.

EXAMPLES

In the following, the present disclosure will be specifically described by Examples, but the present disclosure is not limited to these Examples.

In the present Examples, the average particle volume of the magnetic powder, the average particle size of the magnetic powder, the average thickness of a base film (base substrate), the average thickness of the magnetic layer, the average thickness of the foundation layer, the average thickness of the back layer, the average thickness of the magnetic tape (magnetic recording medium), the squareness ratio S1 in the vertical direction, and the squareness ratio S2 in the longitudinal direction, $(w_{max}-w_{min})/w_{min}$, the Young modulus ratio $(E_{TD}/E_{MD})$, and the servo bandwidth $W_{SB}$ are obtained by the procedures described in the above-described embodiment.

Examples 1 to 4 and Comparative Examples 1 and 2

(Fabrication Process of Coating Material for Magnetic Layer Formation)

The coating material for the magnetic layer formation was fabricated as follows. First, a first composition having following combination was kneaded by an extruder. Next, the kneaded first composition and a second composition having following combination were added into a stirring tank provided with a disper and premixed. Subsequently, the coating material for the magnetic layer formation was fabricated by further performing sand mill mixing and filtering.

(First Composition)

Powder of a barium ferrite ($BaFe_{12}O_{19}$) particle (hexagon plate-like shape, average aspect ratio 3.0, and average particle volume 2450 $nm^3$): 100 pts·mass Vinyl chloride resin (cyclohexanone solution 30 mass %): 10 pts·mass (polymerization degree: 300, Mn=10,000, $OSO_3K$=0.07 mmol/g as a polar group, and containing secondary OH=0.3 mmol/g)

Aluminum oxide powder: 5 pts·mass ($\alpha$-$Al_2O_3$, average particle diameter 0.2 μm)

Carbon black: 2 pts·mass (manufactured by Tokai Carbon Co., Ltd., trade name: Seast TA)

(Second Composition)

Vinyl chloride resin: 1.1 pts·mass (resin solution: resin content 30 mass %, cyclohexanone 70 mass %)

n-Butyl stearate: 2 pts·mass

Methyl ethyl ketone: 121.3 pts·mass

Toluene: 121.3 pts·mass

Cyclohexanone: 60.7 pts·mass

Finally, 4 pts·mass of polyisocyanate (trade name: Coronate L, manufactured by Nippon Polyurethane Industry Co., Ltd.) and 2 pts·mass of myristic acid were added as hardeners to the coating material for the magnetic layer formation fabricated as described above.

(Fabrication Process of Coating Material for Foundation Layer Formation)

The coating material for the foundation layer formation was fabricated as follows. First, a third composition having following combination was kneaded by the extruder. Next, the kneaded third composition and a fourth composition having following combination were added to the stirring tank provided with the disper and premixed. Subsequently, the coating material for the foundation layer formation was fabricated by further performing sand mill mixing and filtering.

(Third Composition)

Acicular iron oxide powder: 100 pts·mass ($\alpha$-$Fe_2O_3$, average long axis length of 0.15 μm)

Vinyl chloride resin: 55.6 pts·mass (resin solution: resin content 30 mass %, cyclohexanone 70 mass %)

Carbon black: 10 pts·mass (average particle diameter of 20 nm)

(Fourth Composition)

Polyurethane resin UR8200 (manufactured by Toyobo Co., Ltd.): 18.5 pts·mass n-Butyl stearate: 2 pts·mass Methyl ethyl ketone: 108.2 pts·mass Toluene: 108.2 pts·mass Cyclohexanone: 18.5 pts·mass Finally, 4 pts·mass of polyisocyanate (trade name: Coronate L, manufactured by Nippon Polyurethane Industry Co., Ltd.) and 2 pts·mass of myristic acid were added as hardeners to the coating material for the foundation layer formation fabricated as described above.

(Fabrication Process of Coating Material for Back Layer Formation)

A coating material for the back layer formation was fabricated as follows. The coating material for the back layer formation was fabricated by mixing following raw materials in the stirring tank provided with the disper and performing filtering.

Carbon black (trade name: #80 manufactured by Asahi Carbon Co., Ltd.): 100 pts·mass Polyester polyurethane: 100 pts·mass (Trade name: N-2304 manufactured by Nippon Polyurethane Industry Co., Ltd.)

Methyl ethyl ketone: 500 pts·mass

Toluene: 400 pts·mass

Cyclohexanone: 100 pts·mass (Deposition Process)

The foundation layer having an average thickness of 1.1 μm and the magnetic layer having an average thickness of 85 nm were formed on a long PEN film (average thickness of 4.2 μm) as the support (base film) by using the coating materials produced as described above. First, the foundation layer was formed on one main surface of the PEN film by applying the coating material for the foundation layer formation to the one main surface of the PEN film and drying the coating material. Next, the magnetic layer was formed on the foundation layer by applying the coating material for the magnetic layer formation onto the foundation layer and drying the coating material. Note that magnetizing field of the magnetic powder was oriented in a thickness direction of the PEN film by using a solenoid coil at the time of drying the coating material for the magnetic layer formation. Additionally, the squareness ratio S1 in the thickness direction (vertical direction) of a magnetic tape was set to 65% and the squareness ratio S2 in the longitudinal direction thereof was set to 35% by adjusting the drying conditions (drying temperature and drying period) of the coating material for the magnetic layer formation.

Subsequently, the back layer having an average thickness of 0.3 μm was formed by applying the coating material for the back layer formation onto the other main surface of the PEN film on which the foundation layer and the magnetic layer had been formed, and drying the coating material. Then, hardening processing was performed for the PEN film on which the foundation layer, the magnetic layer, and the back layer had been formed. Thereafter, calendering treatment was performed to smoothen a surface of the magnetic layer.

(Cutting Process)

The magnetic tape obtained as described above was cut into a ½-inch width (12.65 mm). With this cutting, an intended long-shaped magnetic tape (average thickness: 5.6 μm) was obtained.

Note that, in Examples 1 to 4 and Comparative Examples 1 and 2, a value of $(w_{max}-w_{min})/w_{min}$ of the magnetic tape was set so as to be within a range of 350 ppm to 450 ppm as illustrated in Table 1 by adjusting an extending amount in the width direction and the longitudinal direction of the PEN film (support). Additionally, a value of Young modulus ratio $(E_{TD}/E_{MD})$ was set so as to be within a range of 1.3 to 2.0 as illustrated in Table 1.

(Servo Signal and Data Signal Writing)

A servo signal and a data signal were written as follows in the long-shaped magnetic tape obtained as described above. First, five servo bands each having a servo bandwidth $W_{SB}$ of 95 μm were formed by using a servo writer and by writing servo signals in the magnetic tape. Note that a row of magnetic patterns each having a chevron-like shape was formed in each servo band by writing the servo signals.

Next, a data signal was written in a data band between servo bands by using a recording/reproducing apparatus. At this point, the recording/reproducing apparatus was controlled such that the recording track width W became 2900 nm and a recording wavelength λ became a single recording wavelength of 192 nm. Note that the recording wavelength λ [nm] of the data signal was four times a magnetization inversion interval L [nm] at the time of performing recording at a shortest recording wavelength (in other words, the shortest recording wavelength was L'=2×L that was twice the recording wavelength λ=L'). A ring head having a gap length of 0.2 μm was used as the recording head.

Here, the reason why the recording wavelength λ was set twice the shortest recording wavelength L' is as follows. In other words, in a recording/reproducing system using a short wavelength, it is general to use, as C/N, a ratio of output/noise at the time of performing recording/reproducing at the recording wavelength twice the shortest recording wavelength. Additionally, the C/N at the double recording wavelength has higher relativity with an error rate than the C/N at the shortest recording wavelength does. Furthermore, in a case where C/N measurement is performed at the shortest recording wavelength, tape noise may be hidden in system noise of the recording/reproducing system depending on a wavelength characteristic of the recording/reproducing system, and a noise characteristic of a medium may not be properly reflected. Particularly, in a case of high linear density recording, there are many cases where noise characteristic of the media is not properly reflected.

Figure 9:
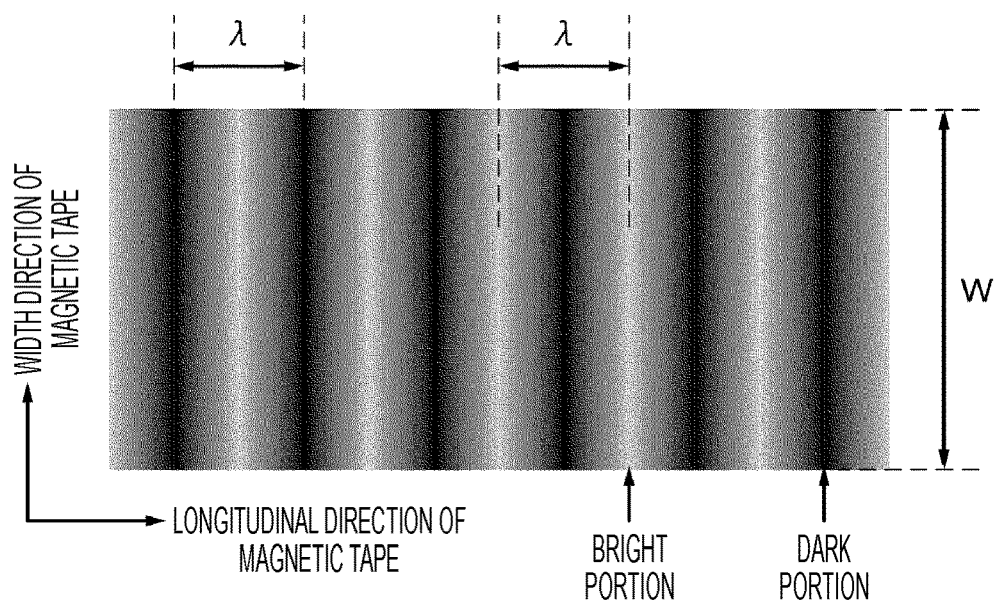
FIG. 9A illustrates an MFM image in a case of recording a data signal at a wavelength λ.
FIG. 9B illustrates an MFM image in a case of recording a data signal at the shortest recording wavelength L'.
Figure 9:
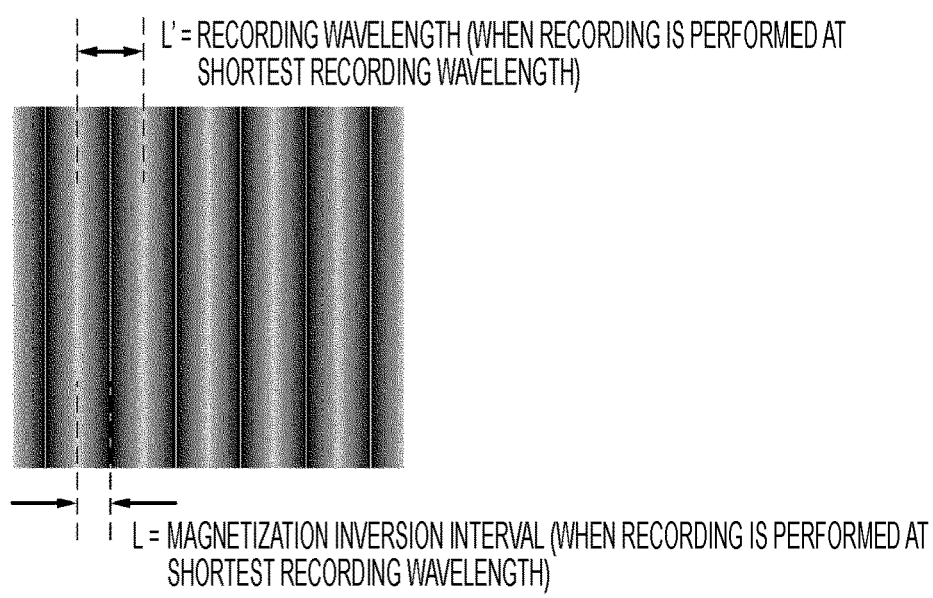

A minimum value L of the magnetization inversion interval and the data track width W were obtained as follows. First, the surface of the magnetic layer 13 was observed by using the magnetic force microscope (MFM) to acquire an MFM image. FIG. 9A and FIG. 9B each illustrate an exemplary MFM image. Next, a dimension of the magnetic pattern row in the width direction of the magnetic tape was measured from the obtained MFM image, and the track width was defined as W [nm]. Additionally, a distance between a bright portion and a bright portion or a distance between a dark portion and a dark portion in the longitudinal direction of the magnetic tape was defined as λ [nm]. Thereafter, a half value of λ [nm] was defined as L' [nm], and a half of the L' [nm] was defined as L [nm].

Example 5

First, a magnetic tape was obtained in a manner similar to Example 1 except that the drying conditions (drying temperature and drying period) of the coating material for the magnetic layer formation were adjusted, the squareness ratio S1 in the thickness direction (vertical direction) of the magnetic tape was set to 55%, and the squareness ratio S2 in the longitudinal direction thereof was set to 45%. Next, a servo signal and a data signal were written in the obtained magnetic tape in a manner similar to Example 1.

Example 6

A magnetic tape was obtained in a manner similar to Example 1 except that the drying conditions (drying temperature and drying period) of the coating material for the magnetic layer formation were adjusted, the squareness ratio S1 in the thickness direction (vertical direction) of the magnetic tape was set to 75%, and the squareness ratio S2 in the longitudinal direction thereof was set to 25%. Next, a servo signal and a data signal were written in the obtained magnetic tape in a manner similar to Example 1.

Example 7

A magnetic tape having an average thickness of 4.9 μm was obtained in a manner similar to Example 1 except that a PEN film having an average thickness of 3.5 μm was used as a support.

Example 8

A magnetic tape having an average thickness of 4.5 μm was obtained in a manner similar to Example 1 except that a PEN film having an average thickness of 3.2 μm was used as a support.

Example 9

A magnetic tape having an average thickness of 5.6 μm was obtained in a manner similar to Example 1 except that a coating thickness of the coating material for the magnetic layer formation was adjusted and the magnetic layer having an average thickness of 35 nm was formed on the foundation layer.

Example 10

A magnetic tape was obtained in a manner similar to Example 1 except that powder of a barium ferrite ($BaFe_{12}O_{19}$) particle (having a hexagon plate-like shape, an average aspect ratio of 2.5, and an average particle volume of 1500 $nm^3$) was used as magnetic powder.

Example 11

A magnetic tape was obtained in a manner similar to Example 1 except that powder of a barium ferrite ($BaFe_{12}O_{19}$) particle (having a hexagon plate-like shape, an average aspect ratio of 2.8, and an average particle volume of 1800 $nm^3$) was used as the magnetic powder.

Example 12

A magnetic tape was obtained in a manner similar to Example 1 except that the squareness ratio S1 in the thickness direction (vertical direction) of the magnetic tape was set to 80% and the squareness ratio S2 in the longitudinal direction thereof was set to 21% by: using a magnetic coating material specially having an excellent dispersion state by prolonging a dispersion time with a sand mill; and increasing a magnetic flux density of a solenoid for vertical orientation in an orientation process for the magnetic coating material.

Example 13

A magnetic tape was obtained in a manner similar to Example 1 except that the squareness ratio S1 in the thickness direction (vertical direction) of the magnetic tape was set to 85% and the squareness ratio S2 in the longitudinal direction thereof was set to 18% by: using a magnetic coating material specially having an excellent dispersion state by prolonging a dispersion time with a sand mill; increasing a magnetic flux density of a solenoid for vertical orientation in an orientation process for the magnetic coating material; and further adjusting a drying time.

Example 14

A magnetic tape was obtained in a manner similar to Example 1 except that powder of a cobalt ferrite particle (having a cubic shape, and an average particle volume of 1200 nm$^3$) was used as the magnetic powder.

Comparative Example 3

First, a magnetic tape was obtained in a manner similar to Comparative Example 2. Next, a servo signal was written in the magnetic tape in a manner similar to Example 1. Subsequently, a data signal was written in the magnetic tape in a manner similar to Example 1 except that the recording/reproducing apparatus was controlled such that the data track width W became 3300 nm.

Comparative Example 4

Extending amounts in the width direction and the longitudinal direction of the PEN film (support) were adjusted such that values of $(w_{max}-w_{min})/w_{min}$ and a Young modulus ratio $(E_{TD}/E_{MD})$ of the magnetic tape became 500 ppm and 1.2 respectively as illustrated in Table 1.

Comparative Example 5

Extending amounts in the width direction and the longitudinal direction of the PEN film (support) were adjusted such that the values of $(w_{max}-w_{min})/w_{min}$ and the Young modulus ratio $(E_{TD}/E_{MD})$ of the magnetic tape became 550 ppm and 1.0 respectively as illustrated in Table 1.

(Recording Capacity)

A recording capacity of the magnetic tape was evaluated in accordance with following criteria.

Possible to achieve large recording capacity: a surface recording density of a magnetic tape is equal to a surface recording density of an evaluation reference sample (Comparative Example 1) or exceeds this surface recording density.

Hard to achieve large recording capacity: a surface recording density of a magnetic tape is less than the surface recording density of the evaluation reference sample (Comparative Example 1).

Note that, in an evaluation result column for the recording capacity in Table 3, a sign "○" indicates an evaluation result of "Possible to achieve large recording capacity", and the sign "x" indicates an evaluation result of the "Hard to achieve large recording capacity". Additionally, "⊙" indicates that it is possible to achieve an extremely high recording capacity among the evaluation results of "Possible to achieve large recording capacity".

(Off-Track Characteristic)

First, two or more rows of chevron-shaped magnetic patterns for servo, which were parallel in the longitudinal direction, were recorded at known intervals from each other in a magnetic tape having the ½-inch width, and then the magnetic tape was incorporated in a cartridge. Then, data was recorded in this sample tape by using the "recording/reproducing apparatus" while the sample tape was made to travel from the outside of the cartridge reel to the inside of the cartridge reel and track control is performed by the servo.

Next, the sample tape was rewound to the outside of the cartridge reel, and then data that had been recorded was read by using the "recording/reproducing apparatus" while the sample tape was made to travel from the outside of the cartridge reel to the inside of the cartridge reel and the track control was performed by the servo. While the data was read from the outside of the cartridge reel to the inside of the reel, a total time during which data could not be read was measured for each tape and defined as an off-tracking time. Nine-level evaluation values were provided on the basis of the off-tracking time of each tape. Note that "9" was defined as the most desirable evaluation value (the best off-track characteristic), and "1" was defined as the most undesirable evaluation value (the worst off-track characteristic).

(SNR)

First, a reproduction signal from a magnetic tape was measured by a spectrum analyzer, and a signal-to-noise ratio (SNR) was calculated from S and N by defining a size of a reproduction signal carrier as S, and defining, as N, magnitude of integrated noise (integration from a low frequency near 0 Hz to a band twice a frequency of the reproduction signal carrier). Next, the obtained SNR was converted into a relative value (dB) based on an SNR of Comparative Example 1 as a reference medium. Next, quality of an electromagnetic conversion characteristic was evaluated as follows by using the SNR (dB) obtained as described above.

Excellent electromagnetic conversion characteristic: an SNR of a magnetic tape is equal to the SNR (=0 (dB)) of the evaluation reference sample (Comparative Example 1) or exceeds this SNR (=0 (dB)).

Poor electromagnetic conversion characteristic: an SNR of a magnetic tape is less than the SNR (=0 (dB)) of the evaluation reference sample (Comparative Example 1).

Note that, in an SNR evaluation result column of Table 3, a sign "○" indicates an evaluation result of "Excellent electromagnetic conversion characteristic", and a sign "x" indicates an evaluation result of "Poor electromagnetic conversion characteristic".

Table 1 illustrates configurations of the magnetic tapes in Examples 1 to 14 and Comparative Examples 1 to 5.

TABLE 1

| | Configuration of magnetic tape | | | | | | | | | | |
|---|---|---|---|---|---|---|---|---|---|---|---|
| | Magnetic powder composition | Magnetic powder shape | Magnetic powder average particle volume [nm$^3$] | Magnetic powder average particle size [nm] | Average thickness of base [μm] | Average thickness of magnetic layer [nm] | Average thickness of tape [μm] | Squareness ratio S1 in vertical direction [%] | Squareness ratio S2 in longitudinal direction [%] | ($w_{max}$ − $w_{min}$)/$w_{min}$ [ppm] | Tape young modulus ratio [$E_{TD}/E_{MD}$] |
| Example 1 | BaFe$_{12}$O$_{19}$ | Plate-like | 2450 | 22.5 | 4.2 | 85 | 5.685 | 65 | 35 | 400 | 1.5 |
| Example 2 | BaFe$_{12}$O$_{19}$ | Plate-like | 2450 | 22.5 | 4.2 | 85 | 5.685 | 65 | 35 | 390 | 1.6 |
| Example 3 | BaFe$_{12}$O$_{19}$ | Plate-like | 2450 | 22.5 | 4.2 | 85 | 5.685 | 65 | 35 | 370 | 1.8 |
| Example 4 | BaFe$_{12}$O$_{19}$ | Plate-like | 2450 | 22.5 | 4.2 | 85 | 5.685 | 65 | 35 | 350 | 2.0 |
| Example 5 | BaFe$_{12}$O$_{19}$ | Plate-like | 2450 | 22.5 | 4.2 | 85 | 5.685 | 55 | 45 | 400 | 1.5 |
| Example 6 | BaFe$_{12}$O$_{19}$ | Plate-like | 2450 | 22.5 | 4.2 | 85 | 5.685 | 75 | 25 | 400 | 1.5 |
| Example 7 | BaFe$_{12}$O$_{19}$ | Plate-like | 2450 | 22.5 | 3.5 | 85 | 5.685 | 65 | 35 | 400 | 1.5 |
| Example 8 | BaFe$_{12}$O$_{19}$ | Plate-like | 2450 | 22.5 | 3.2 | 85 | 5.685 | 65 | 35 | 400 | 1.5 |
| Example 9 | BaFe$_{12}$O$_{19}$ | Plate-like | 2450 | 22.5 | 4.2 | 35 | 5.685 | 65 | 35 | 400 | 1.5 |
| Example 10 | BaFe$_{12}$O$_{19}$ | Plate-like | 1500 | 17.9 | 4.2 | 85 | 5.685 | 65 | 35 | 400 | 1.5 |
| Example 11 | BaFe$_{12}$O$_{19}$ | Plate-like | 1800 | 19.8 | 4.2 | 85 | 5.685 | 65 | 35 | 400 | 1.5 |
| Example 12 | BaFe$_{12}$O$_{19}$ | Plate-like | 2450 | 22.5 | 4.2 | 85 | 5.685 | 80 | 21 | 400 | 1.5 |
| Example 13 | BaFe$_{12}$O$_{19}$ | Plate-like | 2450 | 22.5 | 4.2 | 85 | 5.685 | 85 | 18 | 400 | 1.5 |
| Example 14 | CoFe magnetic material | Cubic | 1200 | 10.6 | 4.2 | 85 | 5.685 | 65 | 35 | 400 | 1.5 |
| Comparative example 1 | BaFe$_{12}$O$_{19}$ | Plate-like | 2450 | 22.5 | 4.2 | 85 | 5.685 | 65 | 35 | 420 | 1.4 |
| Comparative example 2 | BaFe$_{12}$O$_{19}$ | Plate-like | 2450 | 22.5 | 4.2 | 85 | 5.685 | 65 | 35 | 450 | 1.3 |
| Comparative example 3 | BaFe$_{12}$O$_{19}$ | Plate-like | 2450 | 22.5 | 4.2 | 85 | 5.685 | 65 | 35 | 450 | 1.3 |
| Comparative example 4 | BaFe$_{12}$O$_{19}$ | Plate-like | 2450 | 22.5 | 4.2 | 85 | 5.685 | 65 | 35 | 500 | 1.2 |
| Comparative example 5 | BaFe$_{12}$O$_{19}$ | Plate-like | 2450 | 22.5 | 4.2 | 85 | 5.685 | 65 | 35 | 550 | 1.0 |

Table 2 illustrates recording/reproducing formats of the magnetic tapes of Examples 1 to 14 and Comparative Examples 1 to 5.

TABLE 2

| | Recording/reproducing format | | | | | | | | |
|---|---|---|---|---|---|---|---|---|---|
| | Number of servo tracks | Servo band width $W_{SB}$ [μm] | Magnetization inversion interval L [nm] | Linear recording density [kfci] | Data track width W [nm] | Track recording density [ktpi] | W/L | Surface recording density [Mbpsi] | Winding length [m] |
| Example 1 | 5 | 95 | 48 | 529 | 2900 | 8.76 | 60 | 4635 | 960 |
| Example 2 | 5 | 95 | 48 | 529 | 2900 | 8.76 | 60 | 4635 | 960 |
| Example 3 | 5 | 95 | 48 | 529 | 2900 | 8.76 | 60 | 4635 | 960 |
| Example 4 | 5 | 95 | 48 | 529 | 2900 | 8.76 | 60 | 4635 | 960 |
| Example 5 | 5 | 95 | 48 | 529 | 2900 | 8.76 | 60 | 4635 | 960 |
| Example 6 | 5 | 95 | 48 | 529 | 2900 | 8.76 | 60 | 4635 | 960 |
| Example 7 | 5 | 95 | 48 | 529 | 2900 | 8.76 | 60 | 4635 | 1090 |
| Example 8 | 5 | 95 | 48 | 529 | 2900 | 8.76 | 60 | 4635 | 1150 |
| Example 9 | 5 | 95 | 48 | 529 | 2900 | 8.76 | 60 | 4635 | 960 |
| Example 10 | 5 | 95 | 48 | 529 | 2900 | 8.76 | 60 | 4635 | 960 |
| Example 11 | 5 | 95 | 48 | 529 | 2900 | 8.76 | 60 | 4635 | 960 |
| Example 12 | 5 | 95 | 48 | 529 | 2900 | 8.76 | 60 | 4635 | 960 |

TABLE 2-continued

| | | | Recording/reproducing format | | | | | | |
|---|---|---|---|---|---|---|---|---|---|
| | Number of servo tracks | Servo band width $W_{SB}$ [μm] | Magnetization inversion interval L [nm] | Linear recording density [kfci] | Data track width W [nm] | Track recording density [ktpi] | W/L | Surface recording density [Mbpsi] | Winding length [m] |
| Example 13 | 5 | 95 | 48 | 529 | 2900 | 8.76 | 60 | 4635 | 960 |
| Example 14 | 5 | 95 | 48 | 529 | 2900 | 8.76 | 60 | 4635 | 960 |
| Comparative example 1 | 5 | 95 | 48 | 529 | 2900 | 8.76 | 60 | 4635 | 960 |
| Comparative example 2 | 5 | 95 | 48 | 529 | 2900 | 8.76 | 60 | 4635 | 960 |
| Comparative example 3 | 5 | 95 | 48 | 529 | 3300 | 7.70 | 69 | 4073 | 960 |
| Comparative example 4 | 5 | 95 | 48 | 529 | 2900 | 8.76 | 60 | 4635 | 960 |
| Comparative example 5 | 5 | 95 | 48 | 529 | 2900 | 8.76 | 60 | 4635 | 960 | fci: flux change per inch
tpi: track per inch
bpsi: bit per square inch
Winding length: a winding length of a magnetic tape that can be housed in a cartridge having a size 102 mm×105 mm×22 mm (cartridge conforming to LTO)

Table 3 illustrates the evaluation results of the magnetic tapes of Examples 1 to 14 and Comparative Examples 1 to 5.

TABLE 3

| | Recording capacity | Off-track characteristic | SNR [dB] |
|---|---|---|---|
| Example 1 | ○ | 7 | 0 |
| Example 2 | ○ | 7 | 0 |
| Example 3 | ○ | 8 | 0 |
| Example 4 | ○ | 9 | 0 |
| Example 5 | ○ | 7 | −0.8 |
| Example 6 | ○ | 7 | 0.7 |
| Example 7 | ⊙ | 7 | 0 |
| Example 8 | ⊙ | 7 | 0 |
| Example 9 | ○ | 7 | 0 |
| Example 10 | ○ | 7 | 1.7 |
| Example 11 | ○ | 7 | 1.1 |
| Example 12 | ○ | 7 | 0.7 |
| Example 13 | ○ | 7 | 0.8 |
| Example 14 | ○ | 7 | 2.1 |
| Comparative example 1 | ref. | 5 | 0 |
| Comparative example 2 | ○ | 1 | 0 |
| Comparative example 3 | X | 6 | 0 |
| Comparative example 4 | ○ | 2 | 0 |
| Comparative example 5 | ○ | 1 | 0 | ref. Evaluation reference

According to the evaluation results of Examples 1 to 4 and Comparative Examples 1, 2, 4 and 5, it is found that: a high recording capacity can be achieved and off-tracking can be suppressed because the data track width W is 2900 nm or less and the maximum value $w_{max}$ and the minimum value $w_{min}$ satisfy the relation of $(w_{max}-w_{min})/w_{min} \leq 400$ [ppm].

According to the evaluation results of Examples 1, 5, 6, 12 and 13, it is found that the squareness ratio in the vertical direction is preferably 65% or more, more preferably 75% or more from the viewpoint of improving the SNR. Additionally, it is found that 85% or more is still more preferable.

According to the evaluation results of Examples 1, 10, and 11, it is found that the average particle volume of the magnetic powder is preferably 1800 nm³ or less, more preferably 1500 nm³ or less from the viewpoint of improving the SNR.

According to the evaluation result of Comparative Example 3, it is found that in the case where the track width exceeds 2900 nm, off-tracking can be suppressed even when the magnetic tape does not satisfy the relation of $(w_{max}-w_{min})/w_{min} \leq 400$ [ppm]. In other words, in a case where the data track width W is 2900 nm or less, the magnetic tape preferably satisfies the relation of $(w_{max}-w_{min})/w_{min} \leq 400$ [ppm] in order to suppress off-tracking.

While the embodiment and the modified examples thereof according to the present disclosure have been specifically described, the present disclosure is not limited to the embodiment and the modified examples thereof described above, and various kinds of modifications based on the technical idea of the present disclosure can be made.

For example, the configurations, the methods, processes, the shapes, the materials, the numerical values, and the like, which have been described in the above-described embodiment and modified examples thereof, are merely examples, and a configuration, a method, a process, a shape, a material, and a numerical value and the like different therefrom may be used as necessary. Additionally, the chemical formulas of the compounds and the like are representative and are not limited to the recited valences and the like as far as the compounds have general names of the same compounds.

Additionally, the configurations, the methods, the processes, the shapes, the materials, the numerical values, and the like in the embodiment and the modified examples, which have been described above, can be combined with each other without departing from the gist of the present disclosure.

Additionally, in the present specification, a numerical range indicated by using "to" indicates a range including numerical values described before and after "to" as a minimum value and a maximum value, respectively. In the numerical range described stepwise in the present specification, an upper limit or a lower limit value of the numerical range of a certain step may be replaced with an upper limit or a lower limit value of the numerical range of another step. As for the materials exemplified in the present specification, one kind can be used alone, or two or more kinds can be used in combination, unless otherwise specified.

Additionally, the present disclosure can adopt configurations below.

(1)

A magnetic recording medium having a tape-like shape, including:

a base substrate; and a magnetic layer provided on the base substrate, in which a plurality of data tracks can be formed in the magnetic layer, a width of the data track is 2900 nm or less, and in a case of defining, as $w_{max}$ and $w_{min}$, a maximum value and a minimum value respectively out of average values of a width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy Relational Expression (1) below:

$$(w_{max}-w_{min})/w_{min} \leq 400 \text{ [ppm]} \quad (1)$$

(2)

The magnetic recording medium recited in (1), in which a squareness ratio in a vertical direction is 65% or more.

(3)

The magnetic recording medium recited in (1) or (2), in which a squareness ratio in a longitudinal direction is 35% or less.

(4)

The magnetic recording medium recited in any one of (1) to (3), in which the magnetic layer can record data in a manner such that a ratio W/L between a minimum value L of a magnetization inversion interval and a width W of the data track satisfies a relation of W/L≤60.

(5)

The magnetic recording medium recited in any one of (1) to (3), in which the magnetic layer can record data in a manner such that a ratio W/L between a minimum value L of a magnetization inversion interval and a width W of the data track satisfies a relation of W/L≤30.

(6)

The magnetic recording medium recited in any one of (1) to (3), in which the magnetic layer can record data such that a minimum value of the magnetization inversion interval L is 48 nm or less.

(7)

The magnetic recording medium recited in any one of (1) to (6), in which the magnetic layer includes a plurality of servo bands, and a proportion of total area of the servo bands to area of a surface of the magnetic layer is 4.0% or less.

(8)

The magnetic recording medium recited in (7), in which the number of servo bands is five or more.

(9)

The magnetic recording medium recited in (7), in which the number of servo bands is 5+4n (where n is a positive integer) or more.

(10)

The magnetic recording medium recited in any one of (7) to (9), in which a width of the servo band is 95 μm or less.

(11)

The magnetic recording medium recited in any one of (1) to (10), in which an average thickness of the magnetic recording medium is 5.6 μm or less.

(12)

The magnetic recording medium recited in any one of (1) to (11), in which an average thickness of the base substrate is 4.2 μm or less.

(13)

The magnetic recording medium recited in any one of (1) to (12), in which an average thickness of the magnetic layer is 90 nm or less.

(14)

The magnetic recording medium recited in any one of (1) to (13), in which a dimensional change amount Δw in a width direction with respect to a tension change in the longitudinal direction satisfies 700 [ppm/N]≤Δw.

(15)

The magnetic recording medium recited in any one of (1) to (14), in which a thermal expansion coefficient α satisfies 6 [ppm/° C.]≤α≤8 [ppm/° C.], and a humidity expansion coefficient β is β≤5 [ppm/% RH].

(16)

The magnetic recording medium recited in any one of (1) to (15), in which a Poisson's ratio ρ satisfies 0.3≤ρ.

(17)

The magnetic recording medium recited in any one of (1) to (16), in which an elastic limit value $\sigma_{MD}$ in the longitudinal direction satisfies 0.8 [N]≤$\sigma_{MD}$.

(18)

The magnetic recording medium recited in any one of (1) to (17), in which the magnetic layer includes magnetic powder, and the magnetic powder includes hexagonal ferrite, ε-iron oxide, or Co-containing spinel ferrite.

(19)

The magnetic recording medium recited in (18), in which an average aspect ratio of the magnetic powder is 1.0 or more and 3.0 or less.

(20)

The magnetic recording medium recited in (18) or (19), in which the hexagonal ferrite includes at least one kind out of Ba or Sr, and the ε-iron oxide includes at least one kind out of Al or Ga.

(21)

The magnetic recording medium recited in any one of (1) to (20), in which a Young modulus ratio ($E_{TD}/E_{MD}$) between a Young modulus $E_{TD}$ in the width direction and a Young modulus $E_{MD}$ in the longitudinal direction is 1.5 or more and 2.0 or less.

(22)

The magnetic recording medium recited in any one of (1) to (17), in which the magnetic powder includes hexagonal ferrite, and an average particle volume of the magnetic powder is 1000 $nm^3$ or more and 1800 $nm^3$ or less.

(23)

A magnetic recording medium having a tape-like shape, including:

a base substrate; and a magnetic layer provided on the base substrate, in which in a case of defining, as $w_{max}$ and $w_{min}$, a maximum value and a minimum value respectively out of average values of a width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy Relational Expression (1) below:

$$(w_{max}-w_{min})/w_{min} \leq 400 \text{ [ppm]} \quad (1)$$

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 Magnetic recording medium
10A Magnetic recording medium cartridge
10B Cartridge case
10C Reel
11 Base substrate
12 Foundation layer
13 Magnetic layer
14 Back layer
15 Barrier layer
21 Core portion
22 Shell portion
22a First shell portion
22b Second shell portion
30 Recording/reproducing apparatus
31 Spindle
32 Reel
33 Spindle drive device
34 Reel drive device
35 Guide roller
36 Head unit
37 Communication interface
38 Control device
41 Server
42 Personal computer
43 Network

The invention claimed is:

1. A magnetic recording medium having a tape-like shape, comprising:
a base substrate; and
a magnetic layer provided on the base substrate,
wherein a plurality of data tracks can be formed in the magnetic layer,
a width of the data track is 2900 nm or less, and
in a case of defining, as $w_{max}$ and $w_{min}$, a maximum value and a minimum value respectively out of average values of a width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy Relational Expression (1) below:

$$(w_{max}-w_{min})/w_{min} \leq 400 \text{ [ppm]} \qquad (1).$$

2. The magnetic recording medium according to claim 1, wherein a squareness ratio in a vertical direction is 65% or more.

3. The magnetic recording medium according to claim 1, wherein a squareness ratio in a longitudinal direction is 35% or less.

4. The magnetic recording medium according to claim 1, wherein the magnetic layer can record data in a manner such that a ratio W/L between a minimum value L of a magnetization inversion interval and a width W of the data track satisfies a relation of W/L≤60.

5. The magnetic recording medium according to claim 1, wherein the magnetic layer can record data in a manner such that a ratio W/L between a minimum value L of a magnetization inversion interval and a width W of the data track satisfies a relation of W/L≤30.

6. The magnetic recording medium according to claim 1, wherein the magnetic layer can record data in a manner such that a minimum value of the magnetization inversion interval L is 48 nm or less.

7. The magnetic recording medium according to claim 1,
wherein the magnetic layer includes a plurality of servo bands, and
a proportion of total area of the servo bands to area of a surface of the magnetic layer is 4.0% or less.

8. The magnetic recording medium according to claim 7, wherein number of servo bands is five or more.

9. The magnetic recording medium according to claim 7, wherein the number of servo bands is 5+4n (where n is a positive integer) or more.

10. The magnetic recording medium according to claim 7, wherein a width of the servo band is 95 µm or less.

11. The magnetic recording medium according to claim 1, wherein an average thickness of the magnetic recording medium is 5.6 µm or less.

12. The magnetic recording medium according to claim 1, wherein an average thickness of the base substrate is 4.2 µm or less.

13. The magnetic recording medium according to claim 1, wherein an average thickness of the magnetic layer is 90 nm or less.

14. The magnetic recording medium according to claim 1,
wherein a dimensional change amount Δw in a width direction with respect to a tension change in the longitudinal direction satisfies 700 [ppm/N]≤Δw, and
wherein Δw is determined according to:

$$\Delta w[\text{ppm/N}] = \frac{D(0.2 \text{ N})[\text{mm}] - D(1.0 \text{ N})[\text{mm}]}{D(02. \text{ N})[\text{mm}]} \times \frac{1,000,000}{(1.0[N]) - (0.2[N])}$$

where D(0.2N) and D(1.0N) represent widths of a sample of the magnetic recording medium subject to loads of 0.2N and 1.0N, respectively, in the longitudinal direction.

15. The magnetic recording medium according to claim 1, wherein a thermal expansion coefficient α satisfies 6 [ppm/° C.]≤α≤8 [ppm/° C.], and a humidity expansion coefficient β satisfies β≤5 [ppm/% RH].

16. The magnetic recording medium according to claim 1, wherein a Poisson's ratio ρ satisfies 0.3≤ρ.

17. The magnetic recording medium according to claim 1, wherein an elastic limit value $\sigma_{MD}$ in the longitudinal direction satisfies 0.8 [N]≤$\sigma_{MD}$, and wherein $\sigma_{MD}$ is determined by pulling a sample of the magnetic recording medium at 0.5 mm/min to obtain a distance versus load relationship.

18. The magnetic recording medium according to claim 1,
wherein the magnetic layer includes magnetic powder, and
the magnetic powder includes hexagonal ferrite, ε-iron oxide, or Co-containing spinel ferrite.

19. The magnetic recording medium according to claim 18, wherein an average aspect ratio of the magnetic powder is 1.0 or more and 3.0 or less.

20. The magnetic recording medium according to claim 18,
wherein the hexagonal ferrite includes at least one kind out of Ba or Sr, and
the ε-iron oxide includes at least one kind out of Al or Ga.

21. The magnetic recording medium according to claim 1, wherein a Young modulus ratio ($E_{TD}/E_{MD}$) between a Young modulus $E_{TD}$ in the width direction and a Young modulus $E_{MD}$ in the longitudinal direction is 1.5 or more and 2.0 or less.

22. The magnetic recording medium according to claim 1, wherein the magnetic powder includes hexagonal ferrite, and
an average particle volume of the magnetic powder is 1000 nm$^3$ or more and 1800 nm$^3$ or less.

23. A magnetic recording medium having a tape-like shape, comprising:
a base substrate; and
a magnetic layer provided on the base substrate,
wherein in a case of defining, as $w_{max}$ and $w_{min}$, a maximum value and a minimum value respectively out of average values of a width of the magnetic recording medium measured under four kinds of environment in which temperature and relative humidity are set to (10° C., 10%), (10° C., 80%), (29° C., 80%), and (45° C., 10%), $w_{max}$ and $w_{min}$ satisfy Relational Expression (1) below:

$$(w_{max}-w_{min})/w_{min} \leq 400 \text{ [ppm]} \qquad (1).$$

* * * * *